(12) United States Patent
West et al.

(10) Patent No.: US 10,714,920 B2
(45) Date of Patent: Jul. 14, 2020

(54) ELECTRONIC TRANSITION CHAMBER

(71) Applicant: Franklin Fueling Systems, LLC, Madison, WI (US)

(72) Inventors: John West, Ipswich (GB); Paul Ridge, Sudbury (GB)

(73) Assignee: Franklin Fueling Systems, Madison, WI (US)

( * ) Notice: Subject to any disclaimer, the term of this patent is extended or adjusted under 35 U.S.C. 154(b) by 122 days.

(21) Appl. No.: 15/564,729

(22) PCT Filed: Jul. 28, 2015

(86) PCT No.: PCT/US2015/042450
§ 371 (c)(1),
(2) Date: Oct. 5, 2017

(87) PCT Pub. No.: WO2016/164064
PCT Pub. Date: Oct. 13, 2016

(65) Prior Publication Data
US 2019/0097406 A1 Mar. 28, 2019

Related U.S. Application Data

(60) Provisional application No. 62/143,424, filed on Apr. 6, 2015, provisional application No. 62/143,876, filed (Continued)

(51) Int. Cl.
*H02G 3/08* (2006.01)
*H02G 15/013* (2006.01)
*H02G 9/10* (2006.01)

(52) U.S. Cl.
CPC ............. *H02G 9/10* (2013.01); *H02G 15/013* (2013.01)

(58) Field of Classification Search
CPC .. H02G 9/10; H02G 9/00; H02G 9/02; H02G 9/04; H02G 9/06; H02G 15/00;
(Continued)

(56) References Cited

U.S. PATENT DOCUMENTS 1,396,434 A * 11/1921 Horton ..................... H02G 3/14
220/3.8
4,685,581 A 8/1987 Kaneda et al.
(Continued)

FOREIGN PATENT DOCUMENTS

| CN | 2070045 U | 1/1991 |
| CN | 1168015 A | 12/1997 |

(Continued)

OTHER PUBLICATIONS

International Search Report for PCT/US2015/042450 dated Jan. 13, 2016, 4 pages.
(Continued)

*Primary Examiner* — Angel R Estrada
(74) *Attorney, Agent, or Firm* — Faegre Drinker Biddle & Reath LLP

(57) ABSTRACT

A chamber for a fueling system includes a housing configured to organize electrical lines based on electrical characteristics. The electrical lines are routed through the electrical transition chamber and extend between a plurality of inlets and a plurality of outlets of the chamber. Additionally, the chamber may include at least one entry seal for carrying the electrical lines into and/or out of the electrical transition chamber. The entry seal includes an electrofusion winding and a compression fitting.

30 Claims, 29 Drawing Sheets

Related U.S. Application Data on Apr. 7, 2015, provisional application No. 62/192,851, filed on Jul. 15, 2015.

(58) Field of Classification Search
CPC ...... H02G 15/013; H02G 15/06; H02G 15/08; H02G 3/08; H02G 3/081; H02G 3/083; H05K 5/00; H05K 5/02; H05K 5/0217; H05K 5/0247; H01R 13/46
USPC ...... 174/50, 520, 59, 549, 559, 53, 60, 68.1, 174/50.5; 220/3.2–3.9, 4.02; 361/600, 361/601, 641

See application file for complete search history.

(56) References Cited

U.S. PATENT DOCUMENTS

| | | | | |
|---|---|---|---|---|
| 5,190,408 | A * | 3/1993 | Ozeki | H02G 9/10 |
| | | | | 174/37 |
| 5,257,487 | A * | 11/1993 | Bantz | H02G 3/283 |
| | | | | 174/486 |
| D364,143 | S | 11/1995 | Weingartner | |
| 5,468,908 | A * | 11/1995 | Arthur | H02G 3/185 |
| | | | | 174/482 |
| 5,528,941 | A | 6/1996 | Ogawa | |
| 5,796,037 | A * | 8/1998 | Young | H02G 3/185 |
| | | | | 174/486 |
| 5,831,212 | A * | 11/1998 | Whitehead | H02G 3/121 |
| | | | | 174/50 |
| 6,610,927 | B2 | 8/2003 | Dinh et al. | |
| 6,831,222 | B2 | 12/2004 | Pastuch | |
| 7,075,005 | B1 * | 7/2006 | Drane | H02G 3/185 |
| | | | | 174/50 |
| 7,762,415 | B2 | 7/2010 | Matsui | |
| 7,968,806 | B2 | 6/2011 | Shelton et al. | |
| 8,035,029 | B2 | 10/2011 | Mullen | |
| 8,248,804 | B2 * | 8/2012 | Han | H02S 40/345 |
| | | | | 136/244 |
| 8,436,259 | B2 | 5/2013 | Green et al. | |
| 8,546,984 | B2 | 10/2013 | Heilman et al. | |
| 2013/0050956 | A1 | 2/2013 | Wang et al. | |
| 2014/0374133 | A1 | 12/2014 | Rost et al. | |
| 2015/0007899 | A1 | 1/2015 | Ekstam | |

FOREIGN PATENT DOCUMENTS

| | | |
|---|---|---|
| CN | 204205483 U | 3/2015 |
| DE | 2539555 | 3/1977 |
| EP | 1749742 | 2/2007 |
| FR | 2663058 | 12/1991 |
| GB | 2464118 | 4/2010 |
| KR | 10-1203678 | 11/2012 |

OTHER PUBLICATIONS

Written Opinion of the International Searching Authority for PCT/US2015/042450 dated Jan. 13, 2016, 5 pages.
English Translation of Chinese Search Report for Application No. 2015800795834, received Jul. 16, 2019, 2 pages.

* cited by examiner

ELECTRONIC TRANSITION CHAMBER

CROSS-REFERENCE TO RELATED APPLICATIONS

The present application claims priority to U.S. Provisional Patent Application Ser. No. 62/143,424, filed on Apr. 6, 2015, and entitled "ELECTRICAL TRANSITION CHAMBER," U.S. Provisional Patent Application Ser. No. 62/143,876, filed on Apr. 7, 2015, and entitled "ELECTRICAL TRANSITION CHAMBER," and U.S. Provisional Patent Application Ser. No. 62/192,851, filed on Jul. 15, 2015, and entitled "ELECTRICAL TRANSITION CHAMBER," the complete disclosures of which are expressly incorporated by reference herein.

FIELD OF THE INVENTION

The present invention relates generally to an electrical transition chamber of a fueling system and, more particularly, to an electrical transition chamber configured to organize electrical lines based on electrical characteristics. The electrical transition chamber includes an entry seal with an electrofusion seal and a compression seal.

BACKGROUND OF THE DISCLOSURE

Transition chambers or sumps may be included in fueling systems to transition pipe lines, wires, electrical lines, or other conduits between various components. For example, electrical transition chambers are included in a fueling system for electrically connecting sensors and other electrical components on fuel tanks and the fuel dispensers to each other and the kiosk power supply and fuel management systems in a fueling service station. In this way, electrical transition chambers receive various electrical lines from portions of the fuel tanks and route the electrical lines to dispensers or other components or systems at the fueling service station.

Current electrical transition chambers may be configured to receive only one type electrical line. For example, a fueling system may include one electrical transition chamber for low-voltage electrical lines and a separate electrical transition chamber for high-voltage electrical lines. As such, current fueling systems may require at least two electrical transition chambers.

Additionally, current electrical transition chambers may have a flat or planar bottom surface on which the electrical lines are positioned. More particularly, the electrical lines are positioned on the same surface on which a person may step if accessing the electrical transition chamber. As such, if a person accesses an electrical transition chamber to repair, replace, and/or reorganize the electrical lines therein, the person may inadvertently step on the electrical wires.

SUMMARY OF THE DISCLOSURE

In one embodiment, a chamber for a fueling system comprises a housing having a lower surface and including at least one raised portion and at least one recessed portion, a plurality of inlets to the housing, and a plurality of outlets from the housing. Electrical wires which extend between the inlets and the outlets are positioned within the at least one recessed portion. A service technician may step atop the raised portion without the disturbing an electrical line positioned in the recessed portion.

In another embodiment, a chamber for a fueling system comprises a housing having a first wall, a second wall opposite the first wall, a third wall coupled to the first and second wall, a fourth wall opposite the third wall, and a lower surface coupled to the first, second, third, and fourth walls. Additionally, the chamber comprises a first support member positioned on the first wall, a second support member positioned on the first wall and spaced apart from the first support member, a third support member positioned on the second wall, and a fourth support member positioned on the second wall and spaced apart from the third support member. The chamber further comprises a plurality of inlets to the housing and a plurality of outlets from the housing. The electrical transition panel also comprises a panel configured to be positioned within the housing and supported by the first, second, third, and fourth support members. The panel includes a fifth support member configured to engage the lower surface of the housing.

In a further embodiment, a fitting for sealing an opening through a wall forming a part of a fueling system comprises a first surface and a heating element positioned to heat the first surface of the fitting and the wall forming a part of the fueling system when the fitting is operably positioned adjacent the opening in the wall. Heating the first surface of the fitting and the wall with the heating element causes the fitting and the wall to bond and form a seal therebetween. The fitting also comprises a compression fitting.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
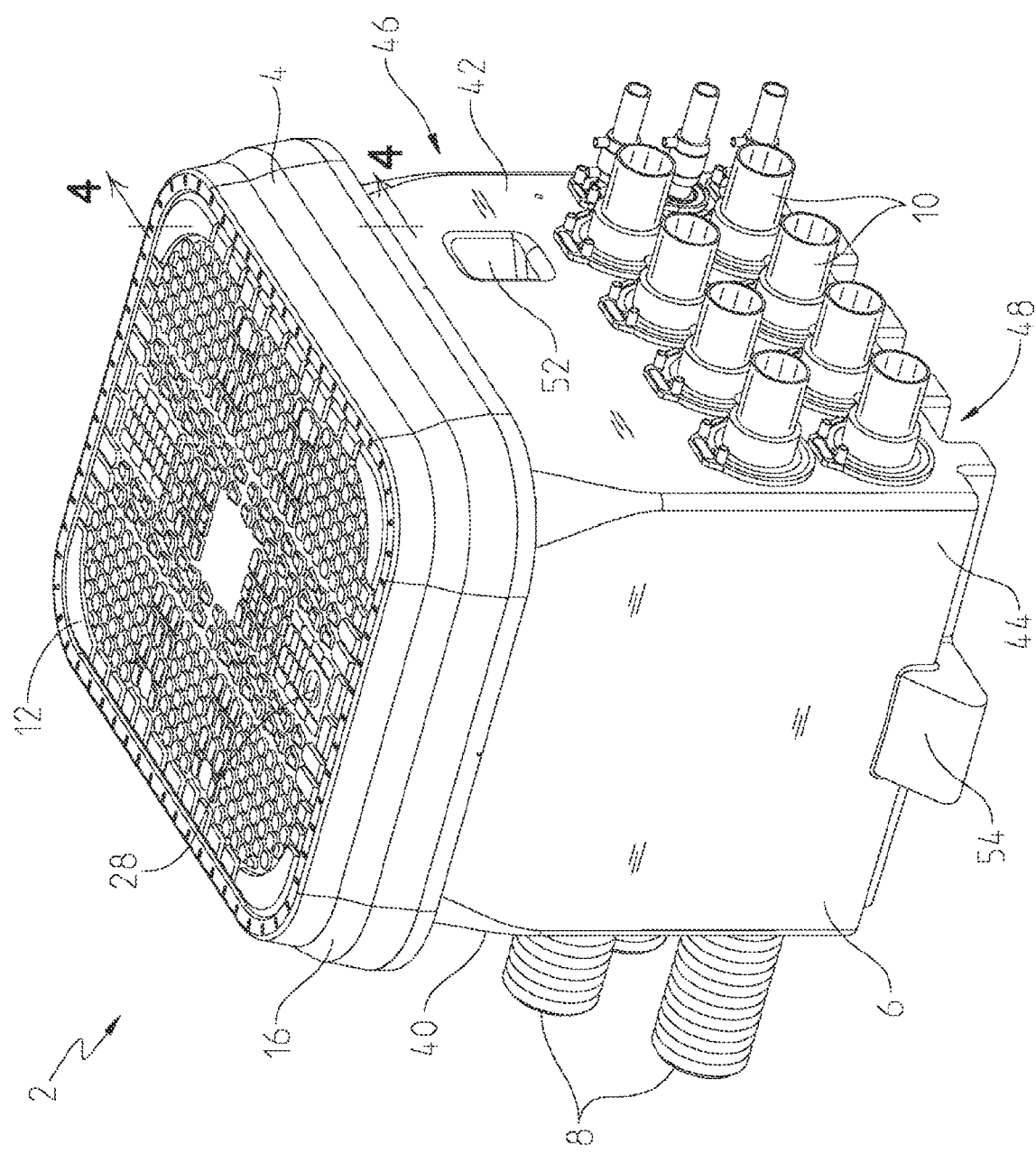
FIG. 1 is a perspective view of a chamber for a fueling system.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 8:
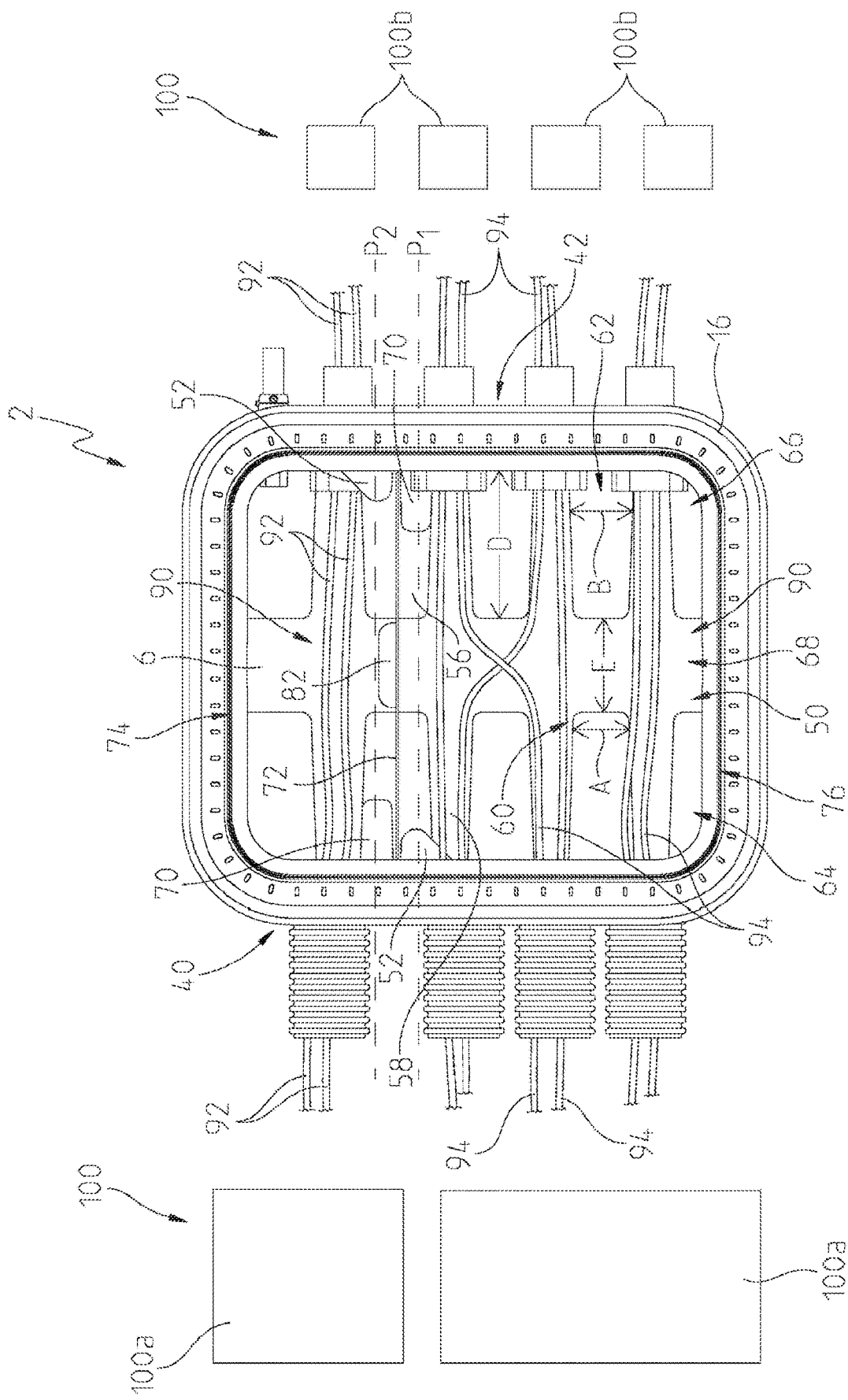
FIG. 8 is a top view of the chamber of FIG. 1 with the access cover removed and including a plurality of electrical lines electrically coupled to various components of the fueling system.

Referring to FIGS. 1-4, a chamber or sump 2 for a fuel system 100 (FIG. 8) is configured to receive a plurality of electrical lines or wires 90, as disclosed further herein. In one embodiment, chamber 2 may be an electrical transition chamber or a tank chamber for fuel system 100 (FIG. 8). Electrical lines 90 are routed through chamber 2 but do not terminate at or in chamber 2. Illustratively, chamber 2 includes an access cover 4, a housing 6, a plurality of inlets 8, and a plurality of outlets 10. Means for providing a vapor-tight seal between inlets 8 and electrical lines 90 and outlets 10 and electrical lines 90 are provided to prevent vapors from being transmitted through inlets and outlets 8, 10. Chamber 2 may be positioned within the ground such that only access cover 4 is exposed. Access cover 4 is removably coupled to housing 6 with a plurality of fasteners 20, for example bolts 20a and washers 20b. A seal or gasket 22 may be positioned intermediate housing 6 and access cover 4 when access cover 4 is coupled to housing 6. More particularly, gasket 22 includes a plurality of apertures 24 configured to receive bolts 20a as bolts 20a extend through a portion of housing 6 and into access cover 4.

Figure 3:
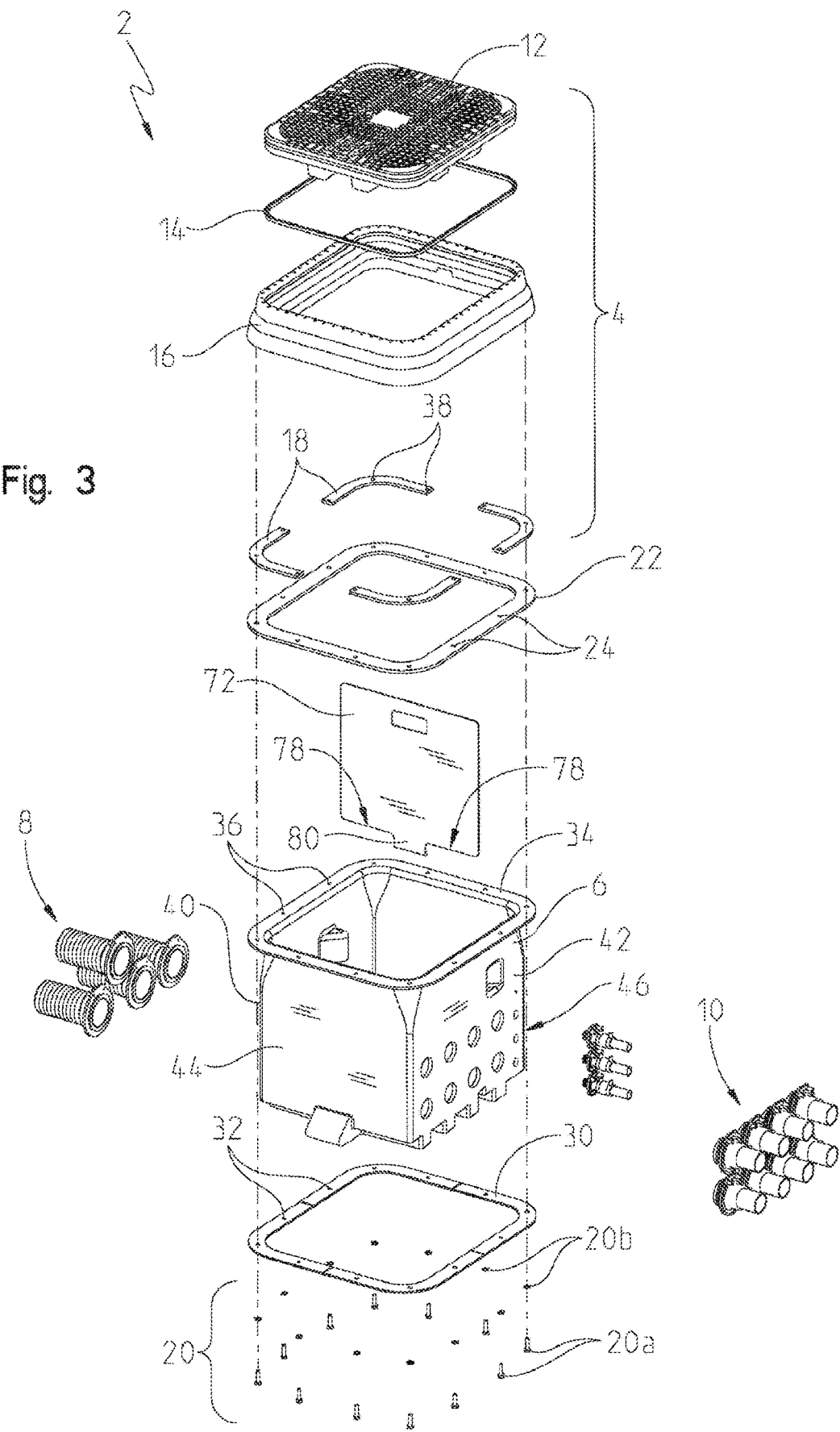
FIG. 3 is an exploded view of the chamber of FIG. 1.
Figure 4:
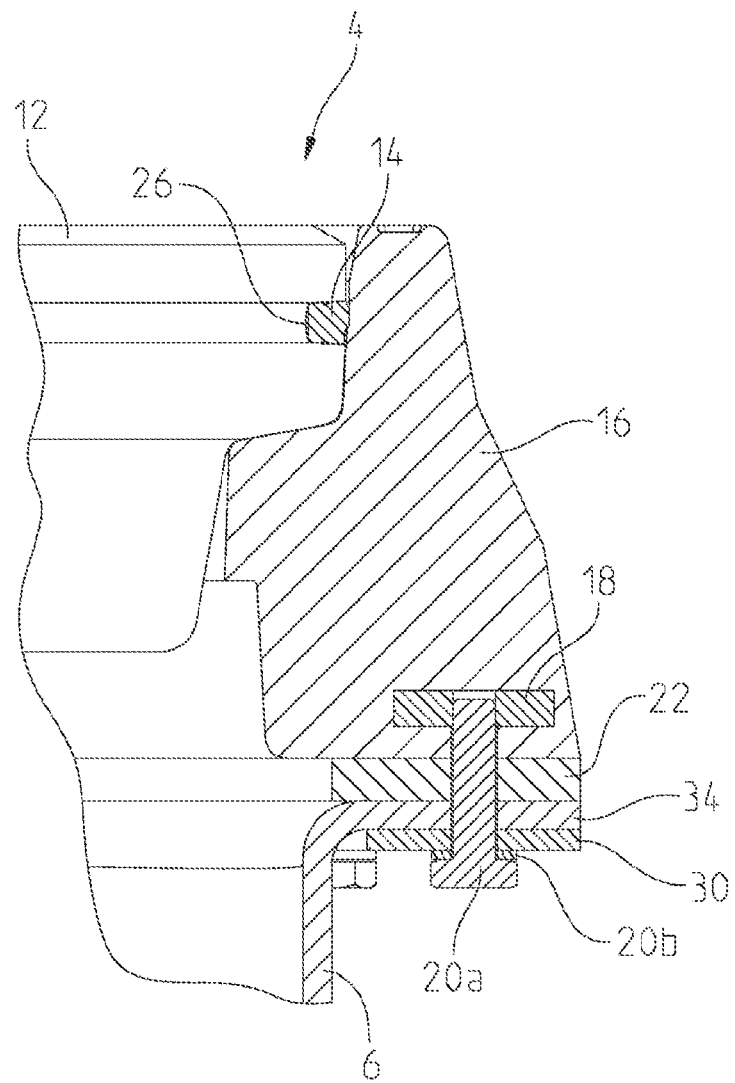
FIG. 4 is a cross-sectional view of a portion of an access cover of the chamber of FIG. 1, taken along line 4-4 of FIG. 1.

As shown in FIGS. 3 and 4, access cover 4 may be comprised of a polymeric material and, illustratively, is comprised of a glass-reinforced polymeric material. Access cover 4 includes an upper cover member 12, a seal 14, a body member or frame 16, and plurality of retaining members 18. Frame 16 may have a tapered configuration with a lower end 16b which is wider than a top end 16a. In use, upper cover member 12 is positioned within a portion of top end 16a of frame 16 such that upper cover member 12 is generally flush with top end 16a of frame 16. Seal 14 may be positioned within a groove 26 of upper cover member 12 to sealingly couple upper cover member 12 to frame 16. Additionally, a locking member 28 may be included on upper cover member 12 to lock upper cover member 12 to frame 16. In one embodiment, locking member 28 may be locked and unlocked with a tool, such as a screwdriver and/or a wrench. Alternatively, locking member 28 may be locked and unlocked with a unique key specific to locking member 28.

Frame 16 also may include retaining members 18, which as shown in FIG. 4, may be embedded within a portion of frame 16. Illustratively, retaining members 18 may be positioned adjacent lower end 16b of frame 16. Retaining members 18 include apertures 38 which have threads or another retaining mechanism for coupling with bolts 20a. More particularly, as shown in FIGS. 3 and 4, when coupling access cover 4 to housing 6, bolts 20a extend through apertures 32 of a coupling member 30 positioned below a flange 34 of housing 6. Washers 20b may be positioned intermediate the head of bolts 20a and coupling member 30. Bolts 20a further extend through apertures 36 of flange 34 and apertures 24 of gasket 22 and into apertures 38 of retaining members 18 to secure access cover 4 to housing 6. When accessing housing 6, access cover 4 may be removed by removing fasteners 20. Alternatively, housing 6 may be accessed by unlocking locking member 28 and removing upper cover member 12 from frame 16.

Figure 2:
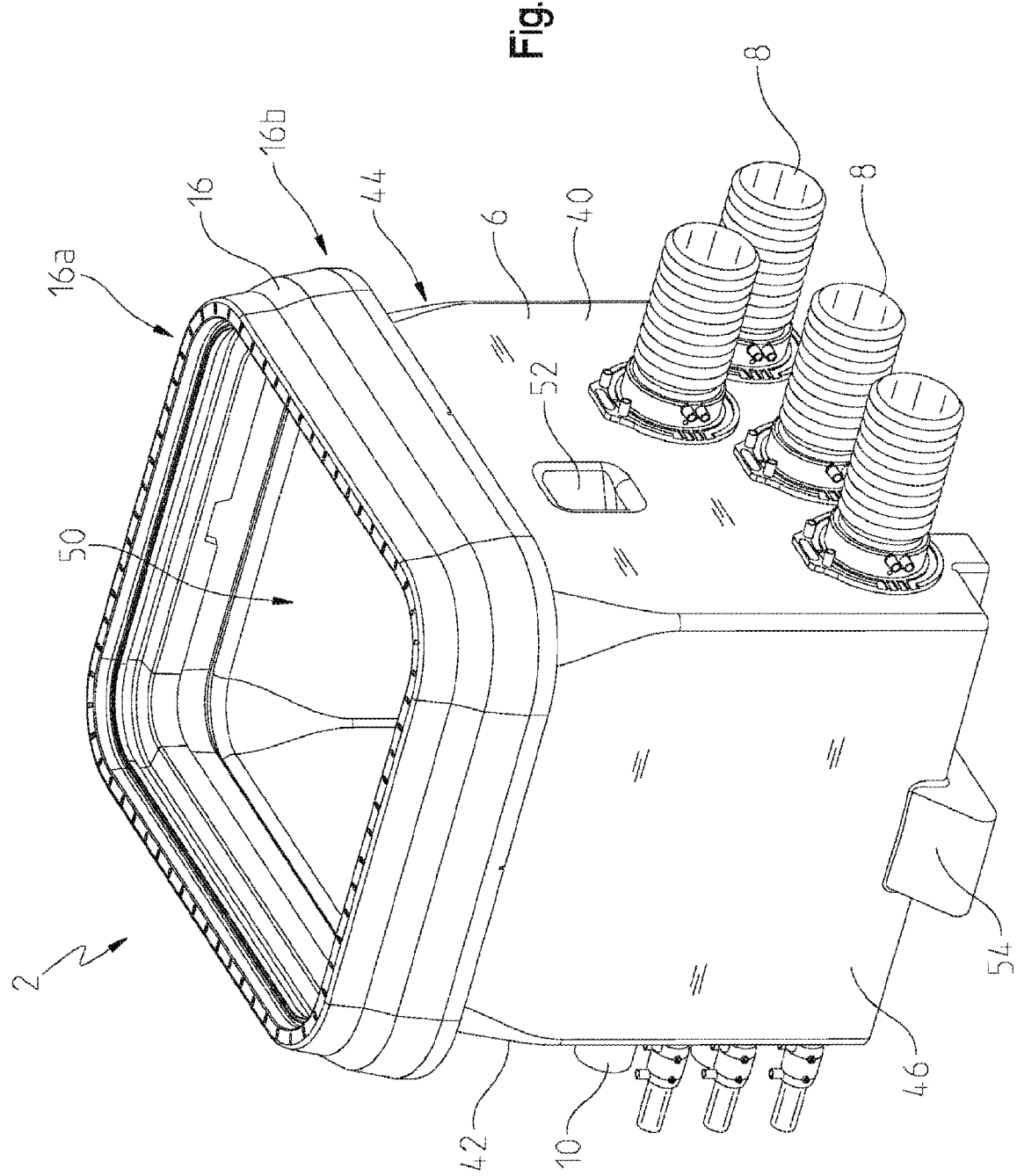
FIG. 2 is a further perspective view of the chamber of FIG. 1, with a portion of an access cover removed.

Referring to FIGS. 1-3, illustrative housing 6 is a unitary structure which includes a first wall 40, a second wall 42 generally opposite first wall 40, a third wall 44 spanning first and second walls 40 and 42, a fourth wall 46 generally opposite third wall 44 and spanning first and second walls 40 and 42, and a lower surface or wall 48 from which first, second, third, and fourth walls 40, 42, 44, 46 extend. Walls 40, 42, 44, 46, 48 generally enclose a singular interior space or volume 50. Illustrative housing 6 generally defines a cube, however, alternative embodiments of housing 6 may have other polygonal configurations (e.g., a triangle, pentagon, octagon, or hexagon in cross-section). As such, walls 40, 42 may be directly coupled to walls 44, 46 to form a cube or may be indirectly coupled to walls 44, 46 through additional walls (not shown) to form any other polygonal structure. Walls 40, 42, 44, 46 extend between flange 34 and lower wall 48. In one embodiment, walls 40, 42, 44, 46 have a height of 500-1200 mm and, more particularly, 700-900 mm, which allows electrical lines 90 to be positioned below the ground by a minimum depth of 500 mm. Housing 6 may be comprised of a polymeric material, for example polyethylene or any other similar material.

Referring to FIGS. 1-3 and 8, first wall 40 includes inlets 8 and second wall 42 includes outlets 10. Inlets 8 define conduits to receive electrical lines 90 from a portion of fuel system 100, such as electrical components (e.g., sensors, processors) on fuel tanks or fuel chambers 100a (FIG. 8). Electrical lines 90 extend into interior volume 50 of housing 6 and pass through outlets 10, which define conduits for electrically coupling with a second portion of fuel system 100, such as electrical components (e.g., sensors, processors) on dispensers 100b or other components at a fuel service station. Electrical lines 90 extending into housing 6 through inlets 8 and out of housing 6 through outlets 10 may have varying voltages such that a first plurality of electrical lines 90 may be low-voltage lines or cables 92, such as intrinsically-safe cables, and a second plurality of electrical lines 90 may be high-voltage line or cables 94, such as data and power cables. Inlets 8 and outlets 10 may be sealed against first wall 40 and second wall 42, respectively, through electro-fusion welding or other similar methods and protrude outwardly therefrom. In this way, housing 6 is sealed against moisture, debris, and other matter. Inlets and outlets 8, 10 are further sealed so as to reduce or inhibit the transfer of vapors from the chambers of fuel tanks 100a (FIG. 8), sumps on dispensers 100b (FIG. 8), or other portions of the fuel station.

Figure 5:
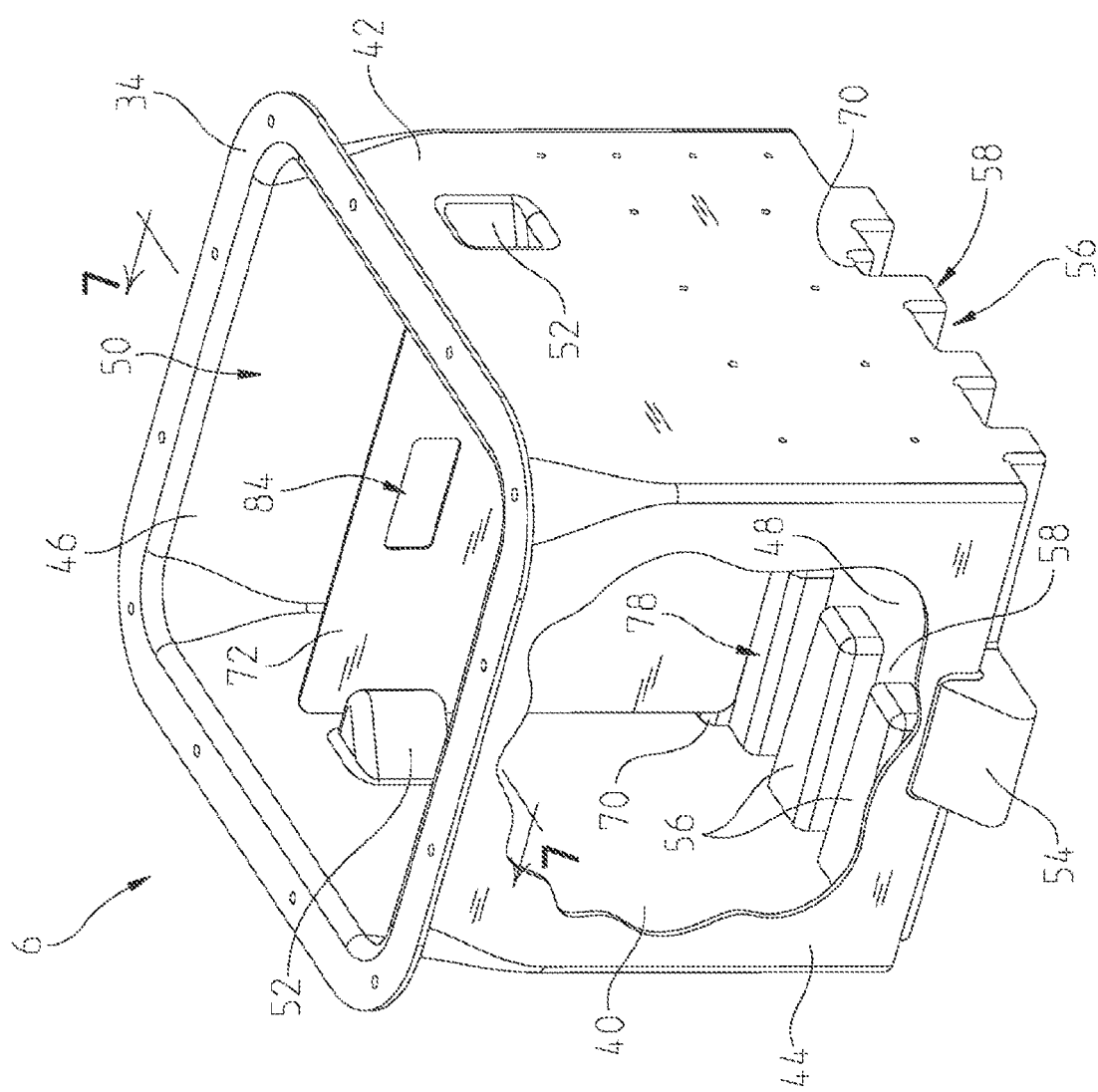
FIG. 5 is a perspective view of a housing of the chamber of FIG. 1 with the access cover removed and a cut-away exposing an interior volume and a segregation panel of the housing.
Figure 6:
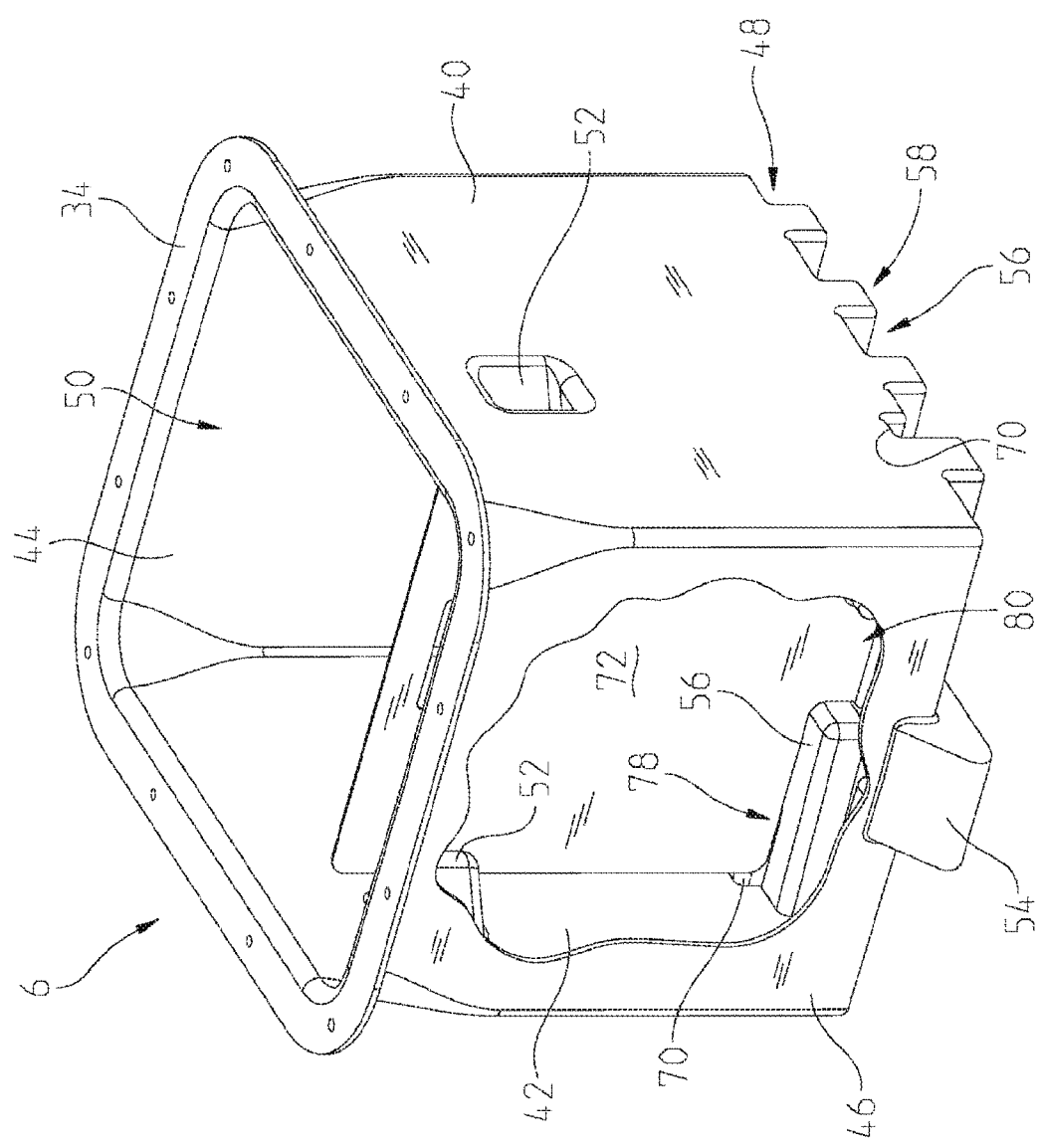
FIG. 6 is a further perspective view of the housing of the chamber of FIG. 5 with a further cut-away exposing the interior volume and the segregation panel.

Referring to FIGS. 5 and 6, first and second wall 40, 42 each also includes an upper support member 52 extending into interior volume 50 of housing 6, as detailed further herein. Illustratively, upper support members 52 are positioned above inlets 8 and outlets 10. In one embodiment, upper support members 52 may define tabs extending into interior volume 50.

Figure 7:
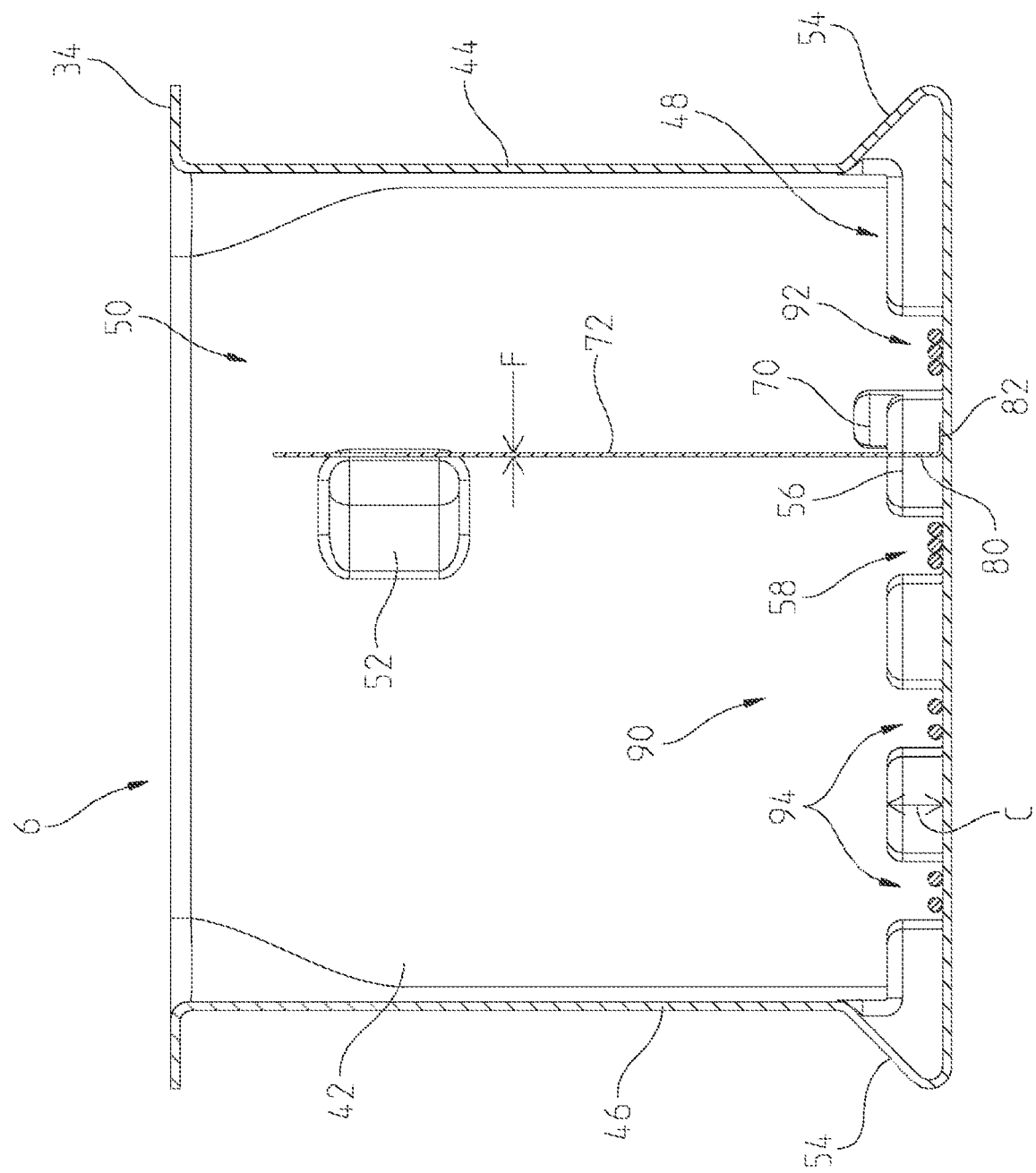
FIG. 7 is a cross-sectional view of the housing and panel of FIG. 5, taken along line 7-7 of FIG. 5.

Referring to FIGS. 5-7, third and fourth walls 44, 46 of housing 6 span first and second walls 40, 42 but do not include inlets or outlets 8, 10. Rather, third and fourth walls 44, 46 include stabilizing or support members 54 protruding outwardly therefrom and join to a portion of lower wall 48 of housing 6. Illustratively, support members 54 are positioned proximate a lower end of third and fourth walls 44, 46 for coupling with lower wall 48. In one embodiment, support members 54 are comprised of the same material as housing 6 and weights may be positioned thereon or otherwise attached thereto to stabilize housing 6, as detailed further herein. Alternatively, support members 54 may be comprised of a metallic or ceramic material (e.g., concrete) and have a weight greater than the weight of housing 6 to stabilize housing 6. More particularly, during operation of fuel system 100, coils (not shown) on electrical lines 90 may have shape memory and, therefore, may move to a default position. Movement of the coils may cause movement of housing 6. However, by providing support members 54, housing 6 may be stabilized during operation of fuel system 100. In one embodiment, support members 54 are included on housing 6 through conventional processes, such as welding. Alternatively, support members 54 may be integrally formed with housing 6.

Referring to FIGS. 5-8, lower wall 48 of housing 6 is joined with first, second, third, and fourth walls 40, 42, 44, 46. Lower wall 48 includes at least one raised portion 56 and at least one recessed portion 58. Illustratively, lower wall 48 includes a plurality of recessed portions 58 alternatively arranged with a plurality of raised portions 56 such that raised portions 56 define platforms of lower wall 48 and recessed portions 58 define troughs of lower wall 48. Recessed portions 58 define the lower-most surface of housing 6 and are positioned adjacent at least one raised portion 56. As disclosed herein, recessed portions 58 define a routing tray for electrical lines 90.

As shown in FIG. 8, raised portions 56 include a first plurality 64 positioned adjacent first wall 40 and second plurality 66 positioned adjacent second wall 42. A channel 68 is defined intermediate first and second pluralities 64, 66 of raised portions 56. Illustrative channel 68 has a width E extending between first and second pluralities 64, 66 of raised portions 56 of approximately 130-160 mm and, more particularly, 144 mm.

As shown in FIG. 8, raised portions 56 have a tapered configuration such that an inner end 60 of raised portions 56 may have a width A which is less than width B of an outer end 62. In one embodiment, width A of inner end 60 is 80-110 mm and width B of outer end 62 is 85-115 mm. Illustratively, width A of inner end 60 is 96 mm and width B of outer end of 103 mm. The narrowing width of raised portions 56 may define a 1° taper from outer end 62 to inner end 60. A length D of raised portions 56 extending from inner end 60 to outer end 62 may be 200-300 mm and, more particularly, 250 mm. Additionally, as shown in FIG. 7, a height C of raised portions 56 may be 35-65 mm and, more particularly, may be 50 mm.

Referring to FIGS. 5-8, housing 6 may further include lower support members 70 extending inward within interior volume 50 from first and second walls 40, 42. Lower support members 70 are positioned adjacent lower wall 48 and are spaced apart from upper support members 52. Illustratively, each lower support member 70 may be integrally formed with one of raised portions 56 or, alternatively, may be coupled thereto through conventional methods (e.g., welding). Lower support members 70 extend upwardly from raised portions 56 and may have a width of approximately half the width of raised portions 56, as shown in FIG. 7.

Referring still to FIGS. 5-8, chamber 2 includes a segregation panel or plate 72 removably positioned within interior volume 50 of housing 6. To facilitate removing segregation panel 72 from housing 6, segregation panel 72 may include an opening 84 defining a handle for pulling segregation panel 72 from housing 6. Segregation panel 72 is provided within housing 6 to define separate sections of unitary housing 6 for separating electrical lines 90 based on various electrical properties (e.g., voltage, current, size). More particularly, segregation panel 72 defines a first section 74 for low-voltage cables 92 and a second section 76 for high-voltage cables 94. In this way, housing 6 remains a singular or unitary structure with a single interior volume 50 but segregation panel 72 creates separation between low-voltage cables 92 and high-voltage cables 94.

Segregation panel 72 may be comprised of a metallic, polymeric, or ceramic material. In one embodiment, segregation panel 72 is comprised of a galvanized metallic material. Illustrative segregation panel 72 has a thickness F (FIG. 7) of 1-20 mm and, more particularly, 3 mm. Segregation panel 72 is received within interior volume 50 of housing 6 and positioned above two raised portions 56 such that segregation panel 72 extends the full distance between first and second walls 40, 42 (FIG. 8). However, the height of segregation panel 72 is less than the height of first and second walls 40, 42. More particularly, the top end of segregation panel 72 may be positioned approximately 90 mm below flange 34 of housing 6. Alternatively, the height of segregation panel 72 may fully extend to flange 34 or may be more than 90 mm below flange 34, depending on the application and configuration of chamber 2.

To accommodate raised portions 56, segregation panel 72 includes two cut-out or recessed portions 78 sized to generally extend above and around raised portions 56. In this way, segregation panel 72 is positioned within housing 6 such that cut-out portions 78 of segregation panel 72 are positioned around at least a portion of raised portions 56. Additionally, segregation panel 72 includes an elongated portion 80 intermediate cut-out portions 78. Elongated portion 80 is integrally formed with segregation panel 72 and extends to channel 68 of housing 6 when segregation panel 72 is positioned therein. Elongated portion 80 includes a tab 82 extending perpendicularly therefrom. Tab 82 is configured to contact and extend along a portion of channel 68 and remain in contact with lower wall 48 when segregation panel 72 is positioned within housing 6.

Segregation panel 72 is stabilized within housing 6 by tab 82 because tab 82 rests on channel 68. More particularly, because segregation panel 72 includes cut-out portions 78 for extending over raised portions 56, tab 82 may be flush against channel 68. Additionally, segregation panel 72 is stabilized within housing 6 by upper support members 52 and lower support members 70. As shown in FIG. 8, upper support member 52 on first wall 40 is positioned along one side of segregation panel 72 and upper support member 52 on second wall 42 is positioned along the other side of segregation panel 72. As such, segregation panel 72 is retained between upper support members 52. Similarly, segregation panel 72 is retained between lower support members 70 because, as shown in FIG. 8, lower support member 70 on first wall 40 is positioned along one side of segregation panel 72 and lower support member 70 on second wall 42 is positioned along the other side of segregation panel 72. Illustratively, as shown in FIG. 8, upper support member 52 and lower support member 70 on first wall 40 are positioned on opposite sides of segregation panel 72 and upper support member 52 and lower support member 70 on second wall 42 also are positioned on opposite sides of segregation panel 72. In this way, segregation panel 72 is retained between upper and lower support members 52, 70 on first and second walls 40, 42. As such, segregation panel 72 is stabilized within housing 6 and remains in the position shown in FIGS. 7 and 8 but is not permanently coupled within housing 6 so that segregation panel 72 may be removed from housing 6.

Referring still to FIG. 8, segregation panel 72 is supported at opposite corners by upper and lower support members 52, 70. More particularly, upper support member 52 on first wall 40 and lower support member 70 on second wall 42 are positioned substantially within a plane P1 extending perpendicularly between the first and second walls, within manufacturing tolerances. Additionally, upper support member 52 on second wall 42 and lower support member 70 on first wall 40 are positioned substantially within a plane P2 extending perpendicularly between the first and second walls, within manufacturing tolerances. By separating upper support members 52 at opposite walls 40, 42 and separating lower support members 70 at opposite walls 40, 42, chamber 2 may be formed during a molding process (e.g., rotomolding or rotational molding) without additional process steps, such as a machining step. For example, if upper support members 52 were both positioned on wall 40, a small gap would be required to receive segregation panel 72. However, such a small gap may be difficult to form during a molding process, so additional processing, such as machining, would be necessary after the molding process to form the gap for segregation panel 72. But, because upper support members 52 are positioned on opposite walls 40, 42, chamber 2 may be formed through a molding process without additional processing steps.

As shown in FIG. 8, chamber 2 is electrically coupled to various components of fuel system 100, such as fuel tanks 100a and dispensers 100b at a fueling service station. To electrically connect sensors, processors, and/or other electrical components on fuel tanks 100a to sensors, processors, and/or other electrical components on dispensers 100b, chamber 2 is positioned within the ground with access cover 4 generally flush with the ground. Inlets 8 of chamber 2 receive electrical lines 90 from fuel tanks 100a. Electrical lines 90 extending into housing 6 from fuel tanks 100a include low-voltage cables 92 and high-voltage cables 94. To organize electrical lines 90 according to its type, purpose, location, or any other electrical lines 90 may be organized into a group(s) of low-voltage cables 92 positioned on one side of segregation panel 72 and a group(s) of high-voltage cables 94 on the other side of segregation panel 72. More particularly, electrical lines 90 are routed into desired groupings through recessed portions 58 and channel 68 on both sides of segregation panel 72 but are not positioned on raised portions 56.

Once electrical lines 90 are organized into various groupings within housing 6 and segregation panel 72 separates low-voltage cables 92 (e.g., intrinsically-safe cables) from high-voltage cables 94 (e.g., power and data cables), electrical lines 90 are received through outlets 10 and electrically connect with various electrical components at fuel dispensers 100b of the service station. While described within electrical lines 90 extending between a fuel tank and fuel dispensers 110b, electrical lines 90 may extend between any other components of a fueling installation.

If access to electrical lines 90 is necessary, access cover 4 may be removed to expose electrical lines 90. More particularly, either the full access cover 4 may be removed or only upper cover member 12 may be removed. Once electrical lines 90 are exposed, the person accessing electrical lines 90 may step into chamber 2 to repair, replace, service, and/or reorganize electrical lines 90. In particularly, raised portions 56 do not include any electrical lines 90 such that the person accessing chamber 2 may step on raised portions 56 without stepping on electrical lines 90 which are routed along recessed portions 58 and channel 68. As such, the structure, materials, and configuration of raised portions 56 are configured to support the weight of a technician. For example, the raised portions 56 may be configured to support a weight of up to 300 lbs.

Referring to FIGS. 9-29, various embodiments of an entry seal for inlets 8 and/or outlets 10 of chamber 2 are shown.

More particularly, the illustrative entry seals include a combination of an electrofusion seal and a removable compression seal. In this way, the entry seals are fused to first and/or second walls 40, 42 of chamber 2 through the electrofusion seal while maintaining access to electrical lines 90 through the removable compression seal, as disclosed further herein. The illustrative entry seals provide a barrier to fluids and vapors entering interior volume 50 (FIG. 2) of chamber 2.

Figure 9:
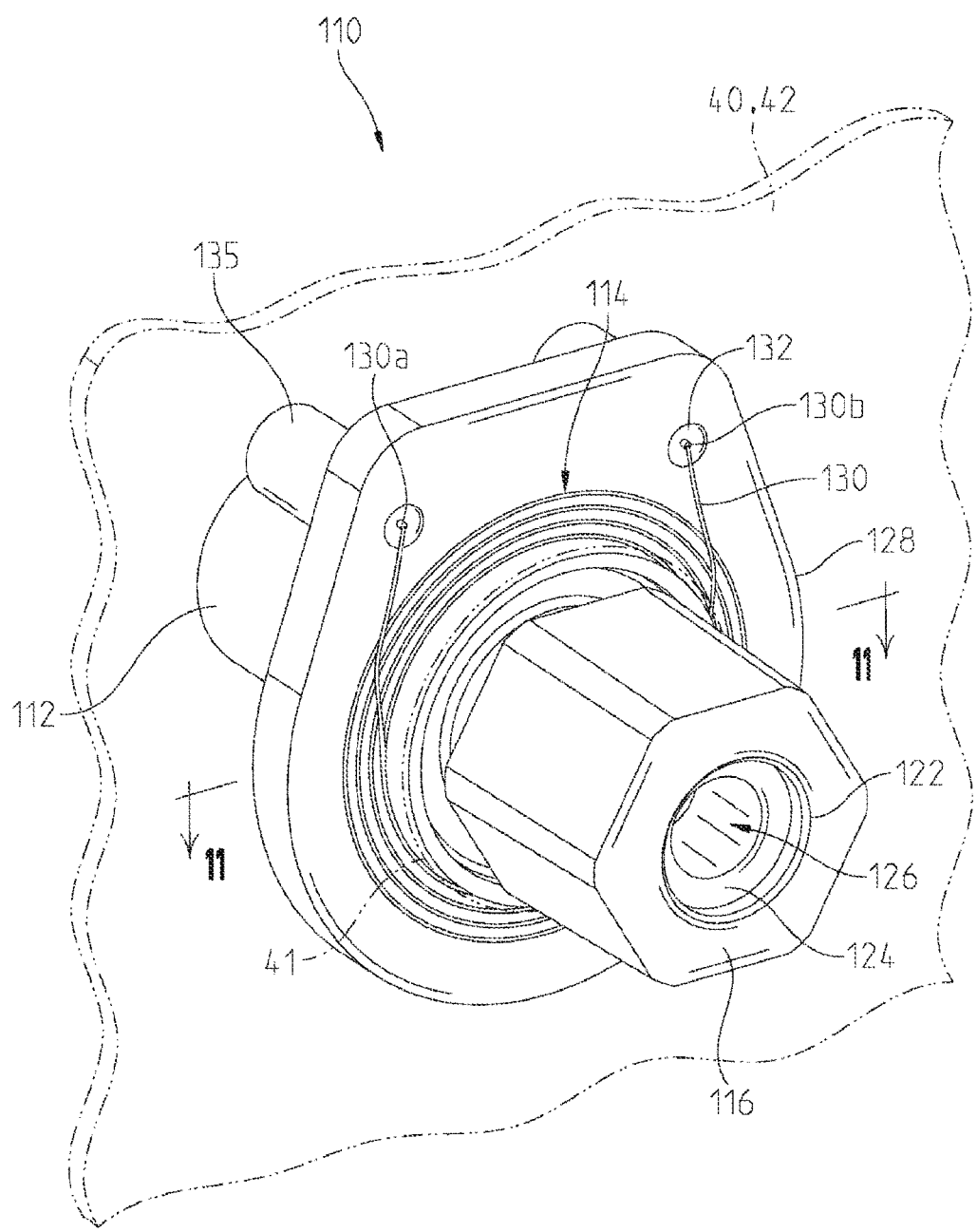
FIG. 9 is a perspective view of a first embodiment of an entry seal for an inlet and/or an outlet of the chamber of FIG. 1.
Figure 10:
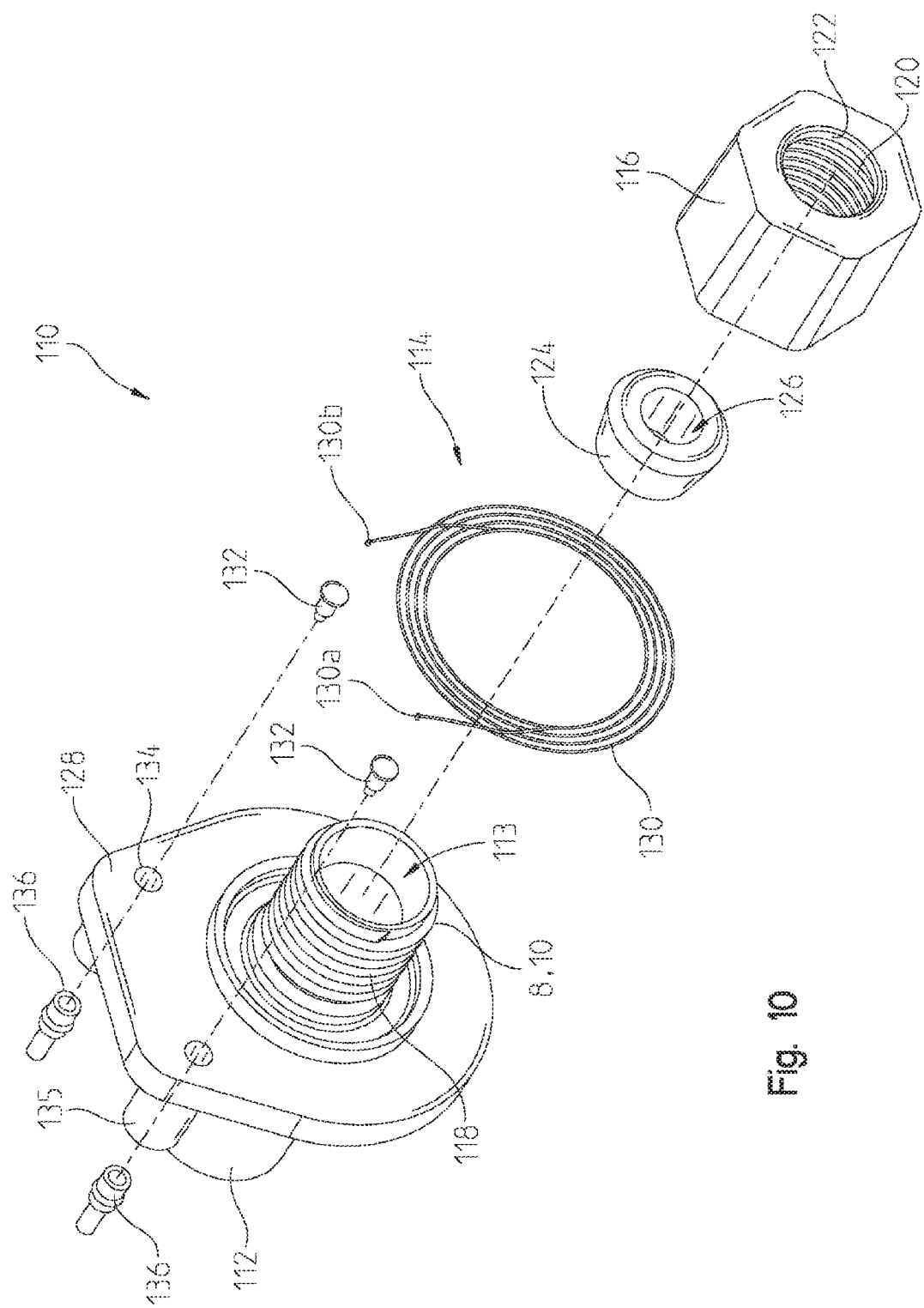
FIG. 10 is an exploded view of the first embodiment entry seal of FIG. 9.
Figure 11:
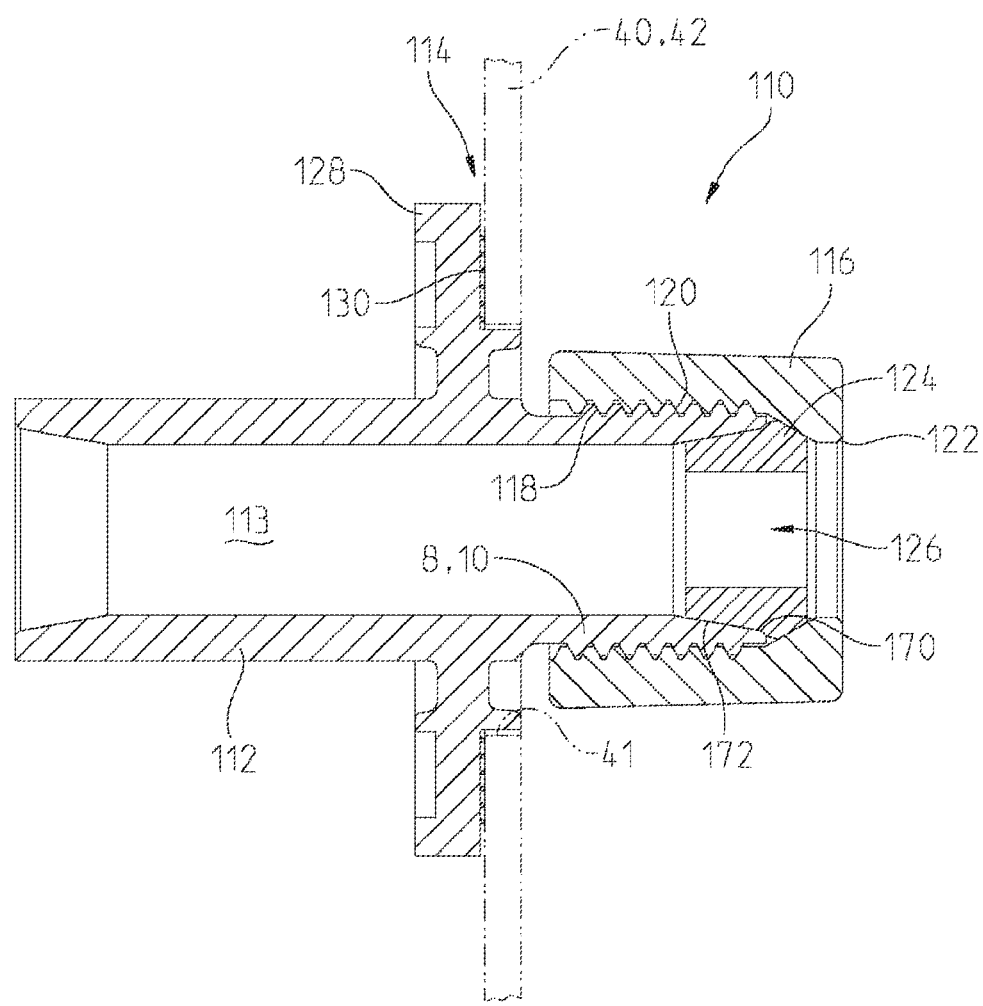
FIG. 11 is a cross-sectional view of the first embodiment entry seal of FIG. 9, taken along line 11-11 of FIG. 9.

As shown in FIGS. 9-11, a first embodiment of an entry seal 110 includes a conduit 112 cooperating with inlet 8 and/or outlet 10 to define a passageway 113 for electrical lines 90 to pass into and out of chamber 2. In one embodiment, a socket welding or fitting (not shown) may be provided to facilitate coupling between conduit 112 and inlet 8 and/or outlet 10 or to facilitate coupling between conduit 112 and any other conduit for electrical lines 90. In one embodiment, conduit 112 is comprised of a polymeric material, such as high-density polyethylene. Entry seal 110 is configured to couple with first wall 40 or second wall 42 such that an opening 41 through wall 40, 42 receives conduit 112. Conduit 112 is configured to receive one or more electrical lines 90.

Additionally, entry seal 110 includes an electrofusion seal 114 and a compression seal or fitting, defined as a compression nut 116. Illustratively, electrofusion seal 114 is positioned on one side of wall 40, 42 and compression nut 116 positioned on the opposite side of wall 40, 42, however, both electrofusion seal 114 and compression nut 116 may be positioned on the same side of wall 40, 42. In one embodiment, compression nut 116 defines a compression nut. Compression nut 116 may be comprised of a polymeric material, such as a nylon material, and is removably coupled to inlets 8 and/or outlets 10. More particularly, compression nut 116 includes internal threads 120 which are threadedly coupled to external threads 118 on inlet 8 and/or outlet 10. Because compression nut 116 is removable from inlet 8 and/or outlet 10 by unscrewing internal threads 120 from external threads 118, electrical lines 90 extending through passageway 113 are accessible for installing, removing, repairing, or replacing electrical lines 90.

As shown in FIGS. 9-11, the compression seal further includes a grommet 124 may be positioned within a portion of compression nut 116 and inlet 8 and/or outlet 10 for sealingly maintaining electrical lines 90 within passageway 113. For example, grommet 124 may be a vapor seal configured to seal interior volume 50 (FIG. 2) of chamber 2 from vapors. Grommet 124 includes at least one open channel 126 which aligns with at least one opening 122 on compression nut 116 and passageway 113 to allow electrical lines 90 or a conduit carrying electrical lines 90 to extend through channel 126 and into and out of chamber 2. Grommet 124 also may have a slot (not shown) in channels 126 for accessing electrical lines 90. Illustratively, grommet 124 has a tapered surface 170 which abuts a complementary tapered surface 172 of inlet 8 and/or outlet 10. In one embodiment, grommet 124 is comprised of a polymeric material, for example a rubber material.

In addition to compression nut 116, entry seal 110 also includes electrofusion seal 114. Electrofusion seal 114 is supported on a support member 128 of entry seal 110 which is configured to abut wall 40, 42 of chamber 2. In one embodiment, support member 128 defines a flange. Electrofusion seal 114 includes electrofusion wiring or winding 130 coupled to supported member 128 with couplers 132. In particular, couplers 132 are operably coupled to leads 130a, 130b of electrofusion winding 130 and pins 136 of electrofusion seal 114 are coupled to couplers 132 through openings 134 and shrouds 135 of support member 128 to electrically connecting winding 130 to an exposed terminal.

When inlet 8 and/or outlet 10 is received through opening 41 in wall 40, 42, electrofusion winding 130 contacts one side of wall 40, 42. In particular, winding 130 is positioned adjacent any surfaces of entry seal 110 and chamber 2 in close proximity of each other in order to couple the adjacent surfaces together through electrofusion. For example, welder (not shown) may be connected to electrofusion winding 130 through pins 136. During operation of the welder, current runs through electrofusion winding 130 which generates heat through resistive heating. This resistive heating generated by the current running through winding 130 is transmitted to a portion of support member 128 and a portion of wall 40, 42. The heat transmitted from electrofusion winding 130 melts the portions of support member 128 and wall 40, 42 at electrofusion winding 130. The melted portions of support member 128 and wall 40, 42 then fuse together to permanently couple support member 128 to wall 40, 42. As such, support member 128 is permanently coupled to wall 40, 42 through electrofusion seal 114 which allows at least one electrical line 90 to pass through passageway 113; however, compression nut 116 is removable from inlet 8 and/or outlet 10 for access to electrical lines 90 when necessary. As such, entry seal 110 includes electrofusion seal 114 for permanently positioning support member 128 and conduit 112 on chamber 2 but also includes compression nut 116 for allowing access to electrical lines 90.

Once entry seal 110 is coupled to chamber 2 through electrofusion seal 114, electrical lines 90 may be received through entry seal 110 for routing through chamber 2. In particular, the outer diameter of electrical lines 90 or the outer diameter of a conduit carrying electrical lines 90 is less than the inner diameter of conduit 112, channels 126 of grommet 124, and opening 122 of compression nut 116. As such, electrical lines 90 pass extend through passageway 113, through grommet 124, and through compression nut 116. More particularly, grommet 124 may be configured to seal against the outer diameter of one of electrical lines 90 passing through channel 126 or may be configured to seal against the outer diameter of a conduit carrying one or more electrical lines 90. To seal interior volume 50 of chamber 2 from any vapor or fluids in passageway 113, compression nut 116 is tightened onto inlet 8 and/or outlet 10 by rotating internal threads 120 along external threads 118. As compression nut 116 is tightened on inlet 8 and/or outlet 10, compression nut 116 pushes grommet 124 into inlet 8 and/or outlet 10 to form a hermetic seal to reduce the flow of any vapor or fluids from passageway 113 into interior volume 50 (FIG. 2).

Figure 12:
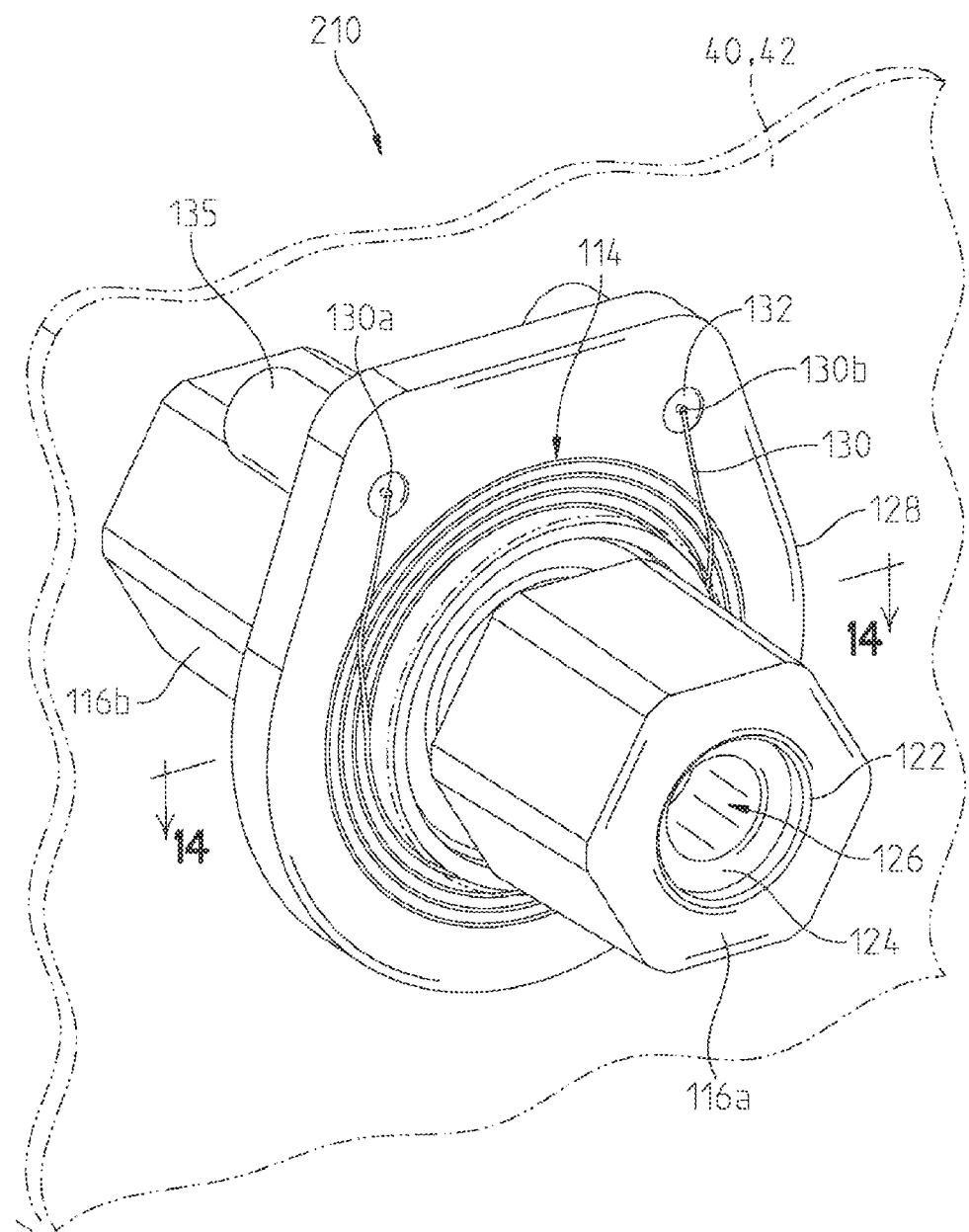
FIG. 12 is a perspective view of a second embodiment of an entry seal for the inlet and/or outlet of the chamber of FIG. 1.
Figure 13:
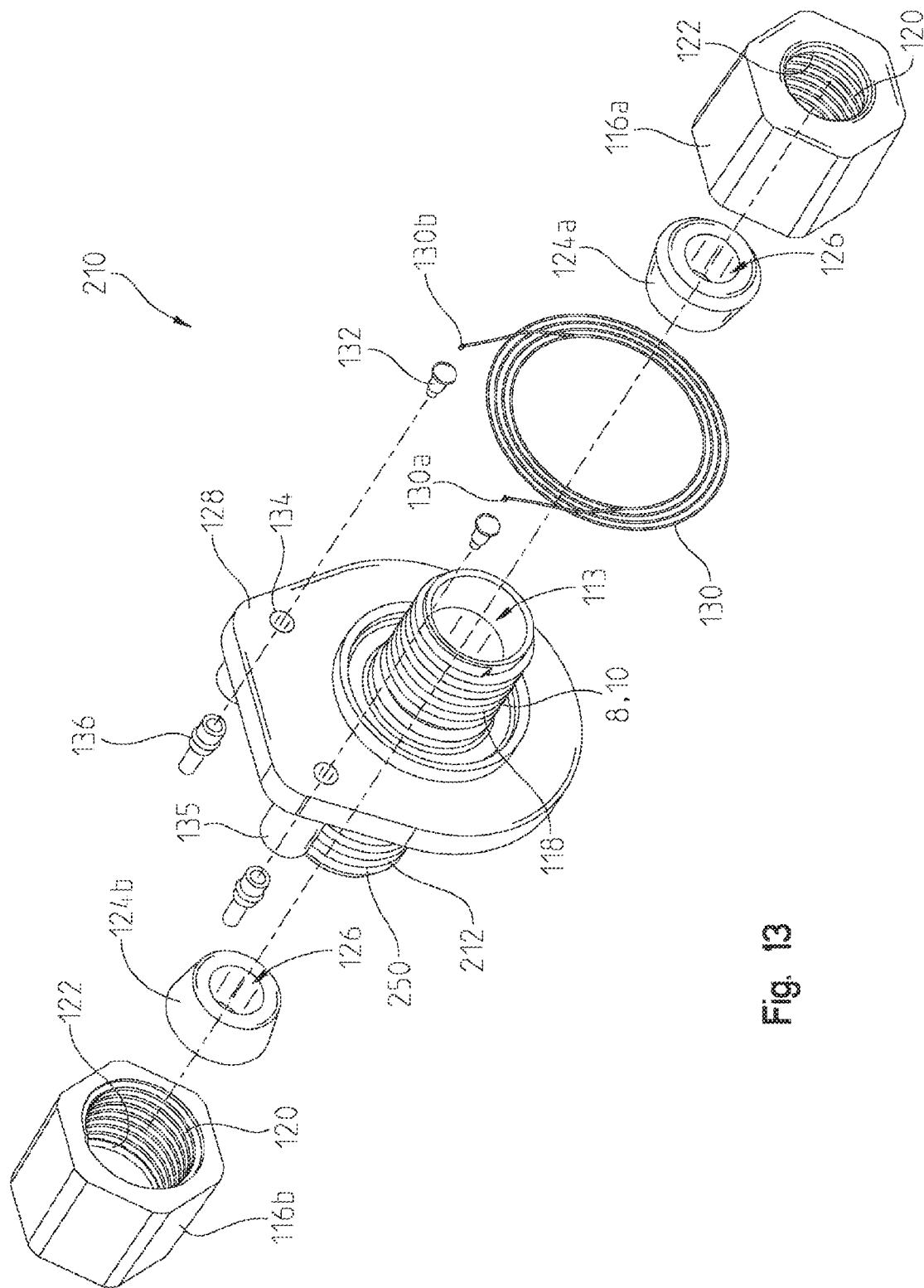
FIG. 13 is an exploded view of the second embodiment entry seal of FIG. 12.
Figure 14:
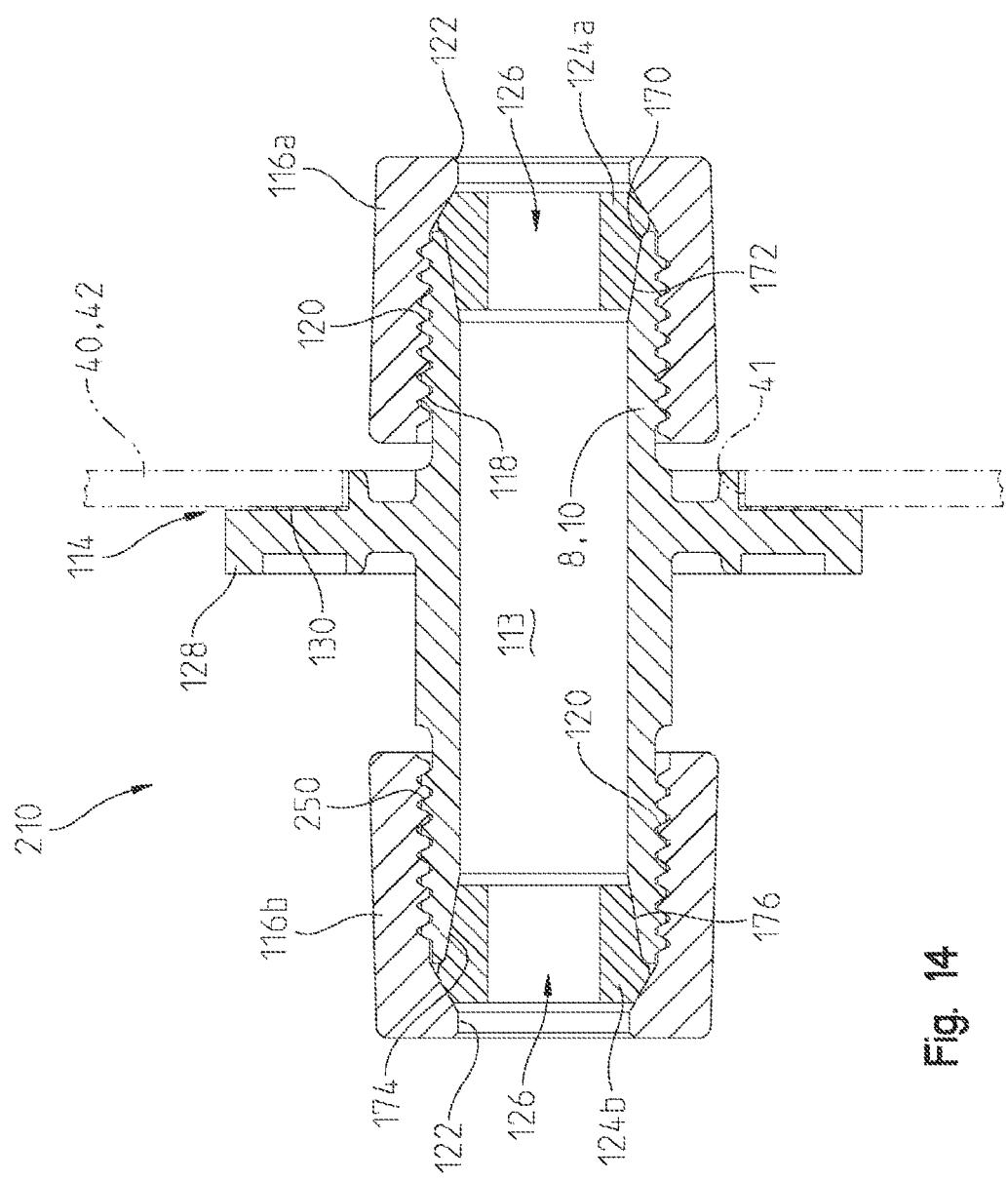
FIG. 14 is a cross-sectional view of the second embodiment entry seal of FIG. 12, taken along line 14-14 of FIG. 12.

As shown in FIGS. 12-14, a second embodiment of an entry seal 210 has corresponding features with similar construction and function to those disclosed herein with respect to entry seal 110, with the corresponding features represented by identical reference numbers. Entry seal 210 includes first and second compression nuts 116a, 116b positioned on opposing sides of wall 40, 42. Additionally, entry seal 210 includes a conduit 212 which cooperates with inlet 8 and/or outlet 10 to define passageway 113 for electrical lines 90 to pass into and out of chamber 2. Conduit 212 has exterior threads 250 for cooperating with second compression nut 116b to threadedly couple second compression nut 116b to conduit 212. Similar to the threaded connection between inlet 8 and/or outlet 10 and first compression nut 116a, both compression nuts 116a, 116b are removable from entry seal 210 for access to electrical lines 90 passing therethrough. In one embodiment, compression nuts 116a, 116b are comprised of a nylon material.

As shown in FIGS. 12-14, the compression seal of entry seal 210 also includes grommets 124a, 124b which are positioned within a portion of respective compression nuts 116a, 116b for sealingly maintaining electrical lines 90 within passageway 113. Grommets 124a, 124b each also may have a slot (not shown) in channels 126 for accessing electrical lines 90. In one embodiment, grommets 124a, 124b may be comprised of a rubber material to define a vapor seal configured to seal interior volume 50 (FIG. 2) of chamber 2 from vapors. As shown in FIG. 14, grommet 124a may include tapered surface 170 which abuts tapered surface 172 of inlet 8 and/or outlet 10. Similarly, grommet 124b may include a tapered surface 174 which abuts a complementary tapered surface 176 of conduit 212.

Once entry seal 210 is coupled to chamber 2 through electrofusion seal 114, electrical lines 90 may be received through entry seal 210 for routing through chamber 2. In particular, the outer diameter of electrical lines 90 or a conduit carrying electrical lines 90 is less than the inner diameter of conduit 112, channels 126 of grommets 124a, 124b, and opening 122 of compression nuts 116a, 116b. More particularly, grommets 124a, 124b are configured to seal against an outer diameter of one electrical line 90 extending through channels 126 or seal against the outer diameter of a conduit carrying one or more electrical lines 90. As such, electrical lines 90 pass extend through passageway 113, through grommets 124a, 124b, and through compression nuts 116a, 116b. To seal interior volume 50 of chamber 2 from any vapor or fluids in passageway 113, compression nuts 116a, 116b which pushes grommets 124a, 124b into inlet 8 and/or outlet 10 and conduit 212, respectively, to form a hermetic seal to reduce the flow of any vapor or fluids from passageway 113 into interior volume 50 (FIG. 2).

Figure 15:
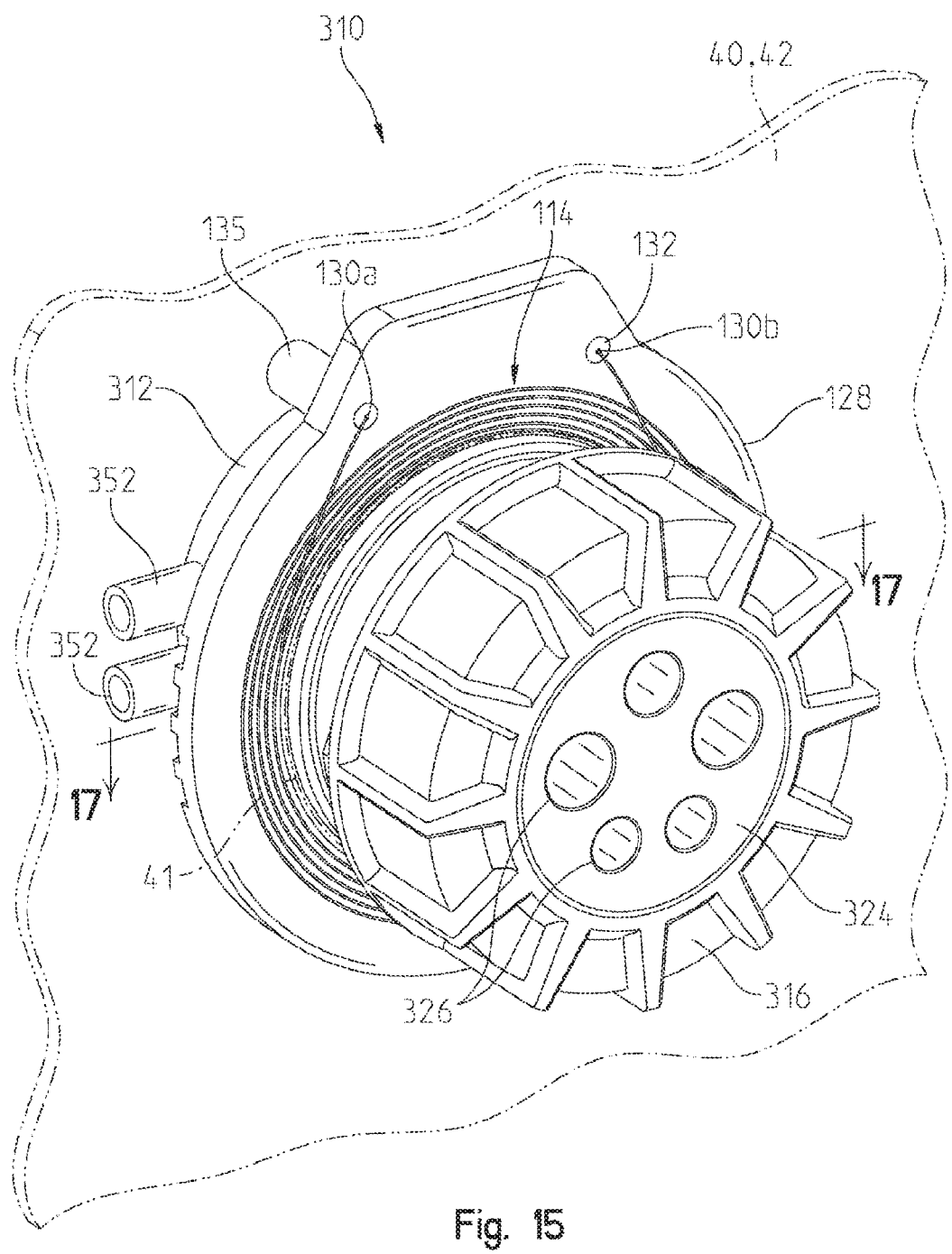
FIG. 15 is a perspective view of a third embodiment of an entry seal for the inlet and/or outlet of the chamber of FIG. 1.
Figure 16:
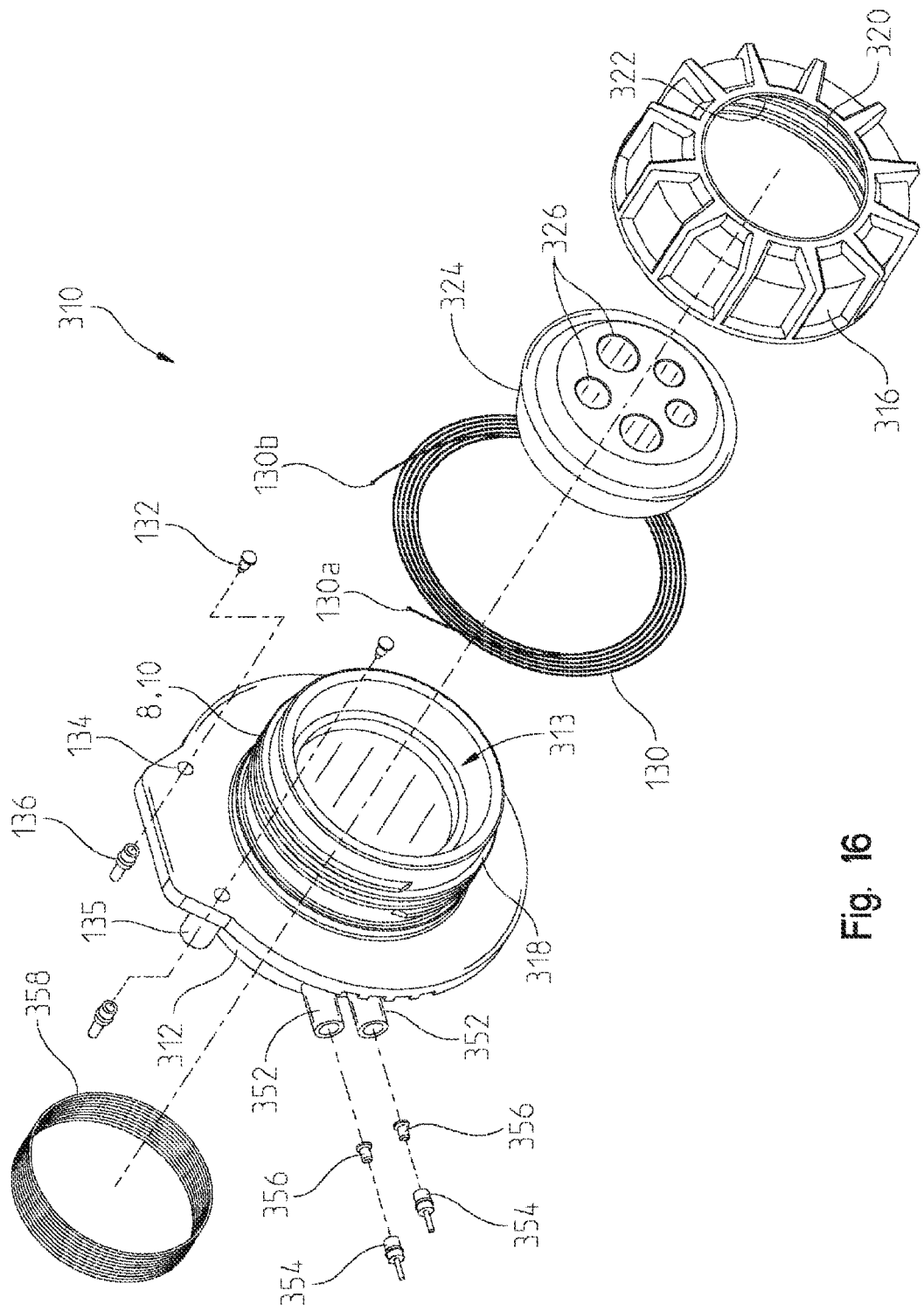
FIG. 16 is an exploded view of the third embodiment entry seal of FIG. 15.
Figure 17:
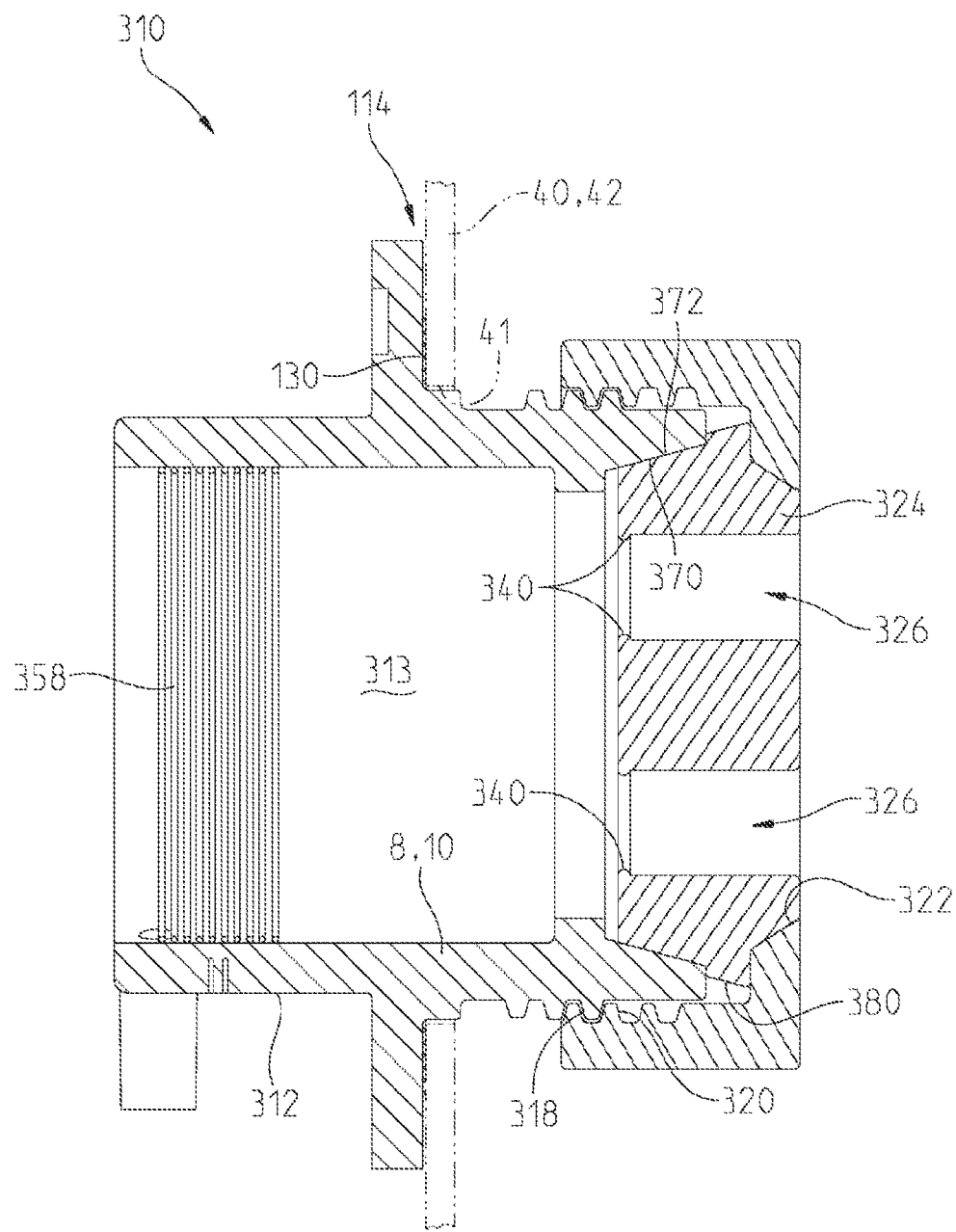
FIG. 17 is a cross-sectional view of the third embodiment entry seal of FIG. 15, taken along line 17-17 of FIG. 15.

Referring to FIGS. 15-17, a third embodiment of an entry seal 310 is shown. Corresponding features of entry seal 310 are similar in construction and function to features of entry seal 110, with the corresponding features represented by identical reference numbers. Entry seal 310 includes a conduit 312 cooperating with inlet 8 and/or outlet 10 to define a passageway 313 for electrical lines 90 to pass into and out of chamber 2. In one embodiment, conduit 312 is comprised of a polymeric material, such as high-density polyethylene. Entry seal 310 is configured to couple with wall 40, 42 such that opening 41 through wall 40, 42 receives conduit 312. Conduit 312 is configured to receive one or more electrical lines 90.

As shown in FIG. 16, electrofusion socket winding 358 may be included on entry seal 310 for electrofusing conduit 312 to any other conduits carrying electrical lines 90. Illustratively, electrofusion socket winding 358 is positioned within conduit 312 and configured to receive a further electrical conduit. A welder (not shown) may be operably coupled to electrofusion socket winding 358 through pins 354 and plugs 356. Pins 354 and plugs 356 are received within shrouds 352 on support member 128. Shrouds 352 extend laterally outwardly from support member 128 and are positioned at an approximately perpendicular orientation to shrouds 135.

During operation of the welder, electrofusion socket winding 358 transmits heat to a portion of conduit 312 and an additional conduit. The heat transmitted from electrofusion socket winding 358 melts the portions of the conduits at electrofusion socket winding 358. The melted portions of the conduits then fuse together to permanently and independently couple conduit 312 to additional conduits carrying electrical lines 90.

Additionally, entry seal 310 includes both electrofusion seal 114 positioned on one side of wall 40, 42 and a compression nut 316 positioned on the opposite side of wall 40, 42. Compression nut 316 may be comprised of a polymeric material, such as a nylon material, and is removably coupled to inlets 8 and/or outlets 10. More particularly, compression nut 316 includes internal threads 320 which are threadedly coupled to external threads 318 on inlet 8 and/or outlet 10. Because compression nut 316 is removable from inlet 8 and/or outlet 10 by unscrewing internal threads 320 from external threads 318, access to electrical lines 90 extending through passageway 313 is achieved for installing, removing, repairing, or replacing electrical lines 90.

As shown in FIGS. 15-17, the compression seal of entry seal 310 further includes a grommet 324 which may be positioned within a portion of compression nut 316 and a portion of inlet 8 and/or outlet 10 for sealingly maintaining electrical lines 90 within passageway 313. Exemplary grommet 324 may be comprised of a rubber material to form a vapor seal configured to seal interior volume 50 (FIG. 2) of chamber 2 from vapors. As shown in FIG. 17, grommet 324 has a tapered surface 370 configured to abut a complementary tapered surface 372 of inlet 8 and/or outlet 10. Grommet 324 also may have a slot (not shown) in channels 326 for accessing electrical lines 90. Additionally, grommet 324 includes a protrusion 380 which is received between opening 322 of compression nut 316 and the distal end of inlet 8 and/or outlet 10.

Grommet 324 includes a plurality of open channels 326 to allow electrical lines 90 to extend through passageway 313 and an opening 322 of compression nut 316. Channels 326 generally define a circle in cross-section and each channel 326 may have the same or a different diameter than adjacent channels 326. Illustratively, grommet 324 includes five channels 326 arranged in a circular configuration, however, grommet 324 may include any number and/or configuration of channels 326. Additionally, grommet 324 may include a circumferential rib 340 molded into at least one end of grommet 324 for further retaining electrical lines 90 and/or a conduit (not shown) within channel 326.

Once entry seal 310 is coupled to chamber 2 through electrofusion seal 114, electrical lines 90 may be received through entry seal 310 for routing through chamber 2. In particular, the outer diameter of electrical lines 90 or a conduit carrying electrical lines 90 is less than the inner diameter of conduit 312, channels 326 of grommet 324, and opening 322 of compression nut 316. More particularly, grommet 324 is configured to seal against the outer diameter of one electrical line 90 extending through channel 326 or is configured to seal against an outer diameter of a conduit carrying one or more electrical lines 90. As such, electrical lines 90 pass extend through passageway 313, through grommet 324, and through compression nut 316. To seal interior volume 50 of chamber 2 from any vapor or fluids in passageway 313, compression nut 316 which pushes grommet 324 into inlet 8 and/or outlet 10 and conduit 312, respectively, to form a hermetic seal to reduce the flow of any vapor or fluids from passageway 313 into interior volume 50 (FIG. 2).

Figure 18:
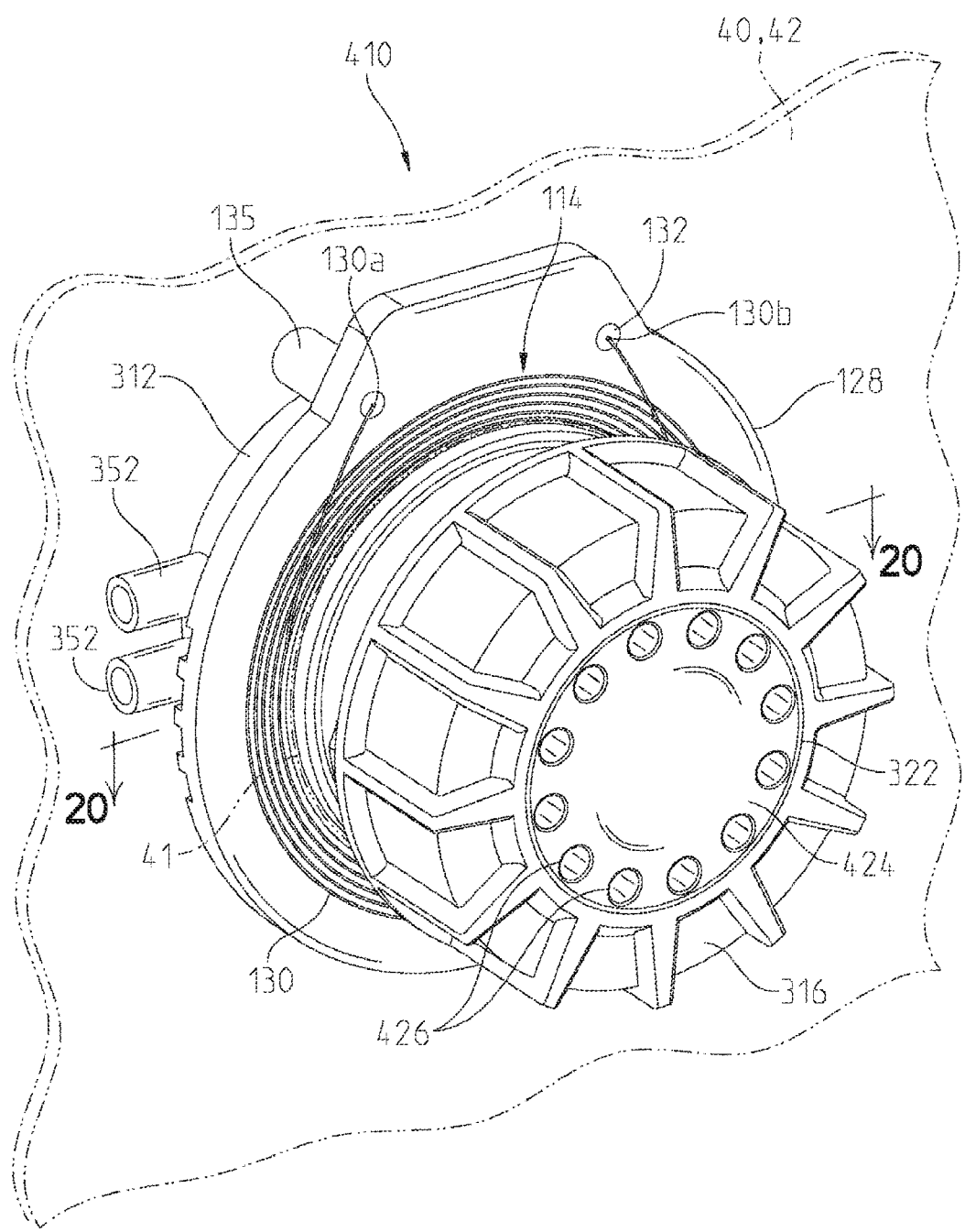
FIG. 18 is a perspective view of a fourth embodiment of an entry seal for the inlet and/or outlet of the chamber of FIG. 1.
Figure 19:
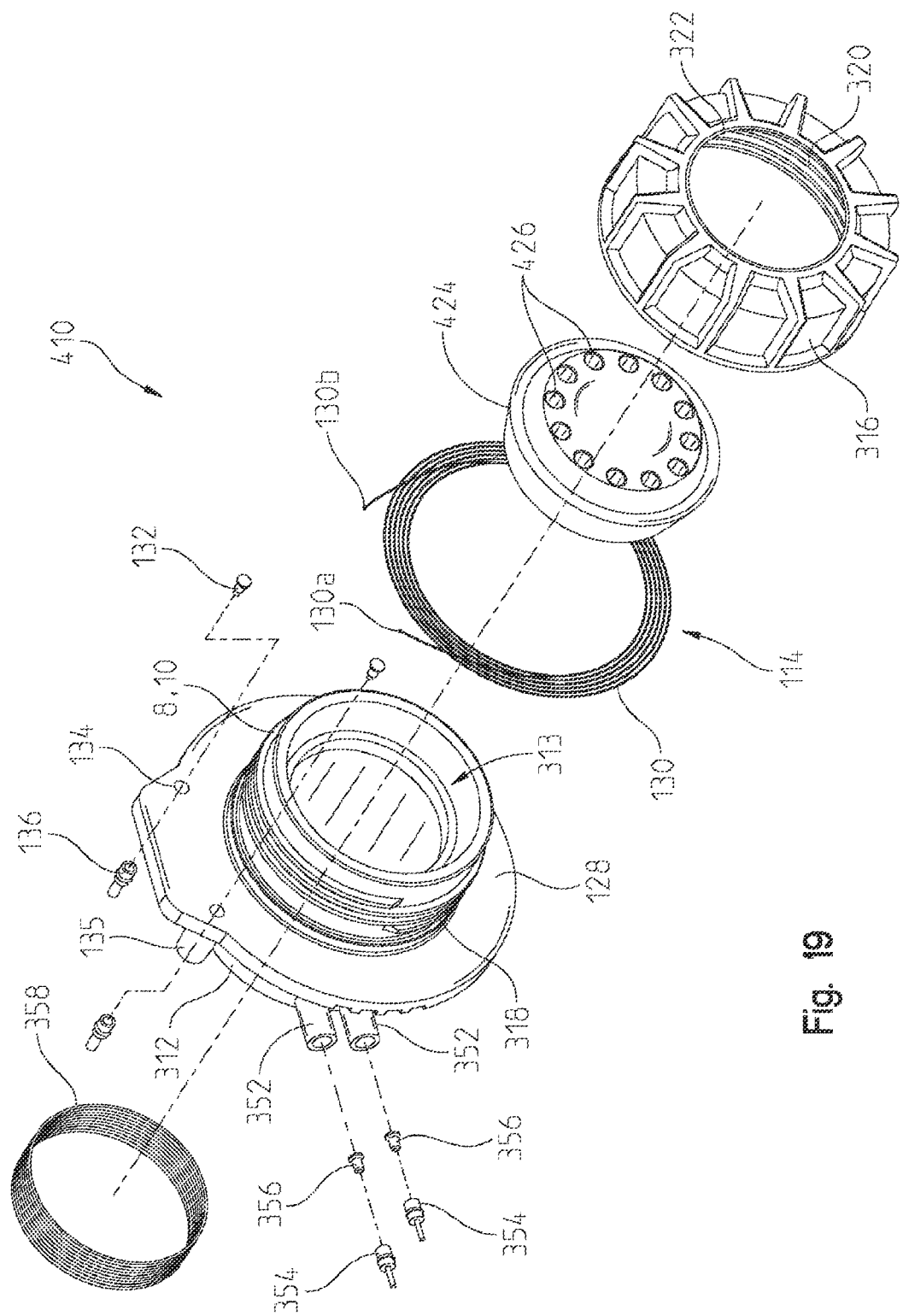
FIG. 19 is an exploded view of the fourth embodiment entry seal of FIG. 18.
Figure 20:
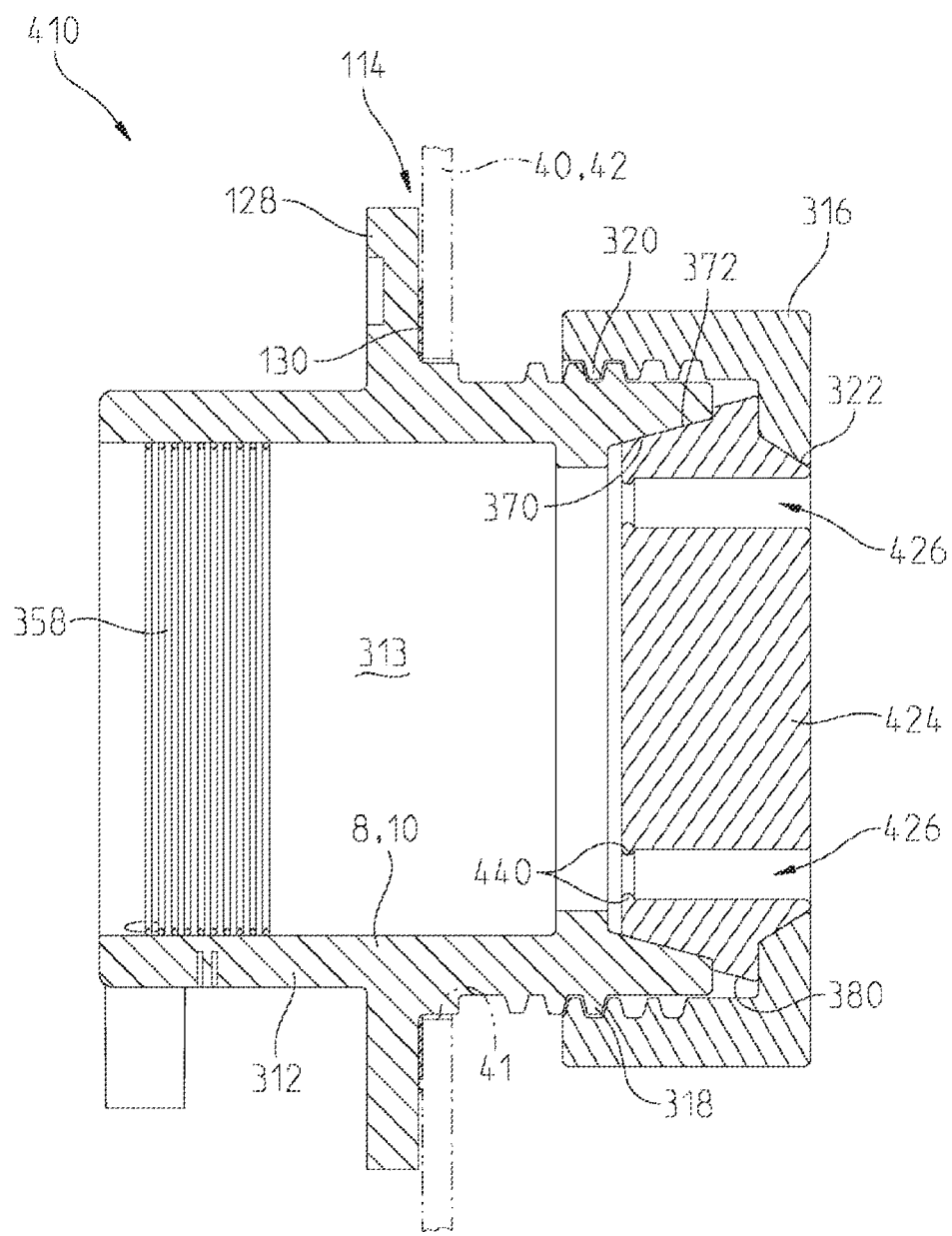
FIG. 20 is a cross-sectional view of the fourth embodiment entry seal of FIG. 18, taken along line 20-20 of FIG. 18.

Referring to FIGS. 18-20, a fourth embodiment of an entry seal 410 has corresponding features with similar construction and function to features of entry seal 310, with the corresponding features represented by identical reference numbers. For example, illustrative entry seal 410 is identical to entry seal 310 except that entry seal 410 includes a grommet 424, rather than grommet 324. Grommet 424 of the compression seal of entry seal 410 includes a plurality of open channels 426 to allow electrical lines 90 to extend through passageway 313 and opening 322 of compression nut 316. Channels 426 generally define a circle in cross-section and, illustratively, each channel 426 has the same diameter as adjacent channels 426. Illustrative grommet 424 includes twelve channels 426 arranged in a circular configuration, however, grommet 424 may include any number and/or configuration of channels 426. Grommet 424 also may have a slot (not shown) in channels 126 for accessing electrical lines 90 and may include a circumferential rib 440 molded into at least one end of grommet 424 for further retaining electrical lines 90 and/or a conduit (not shown) within channel 426. In one embodiment, grommet 424 may be comprised of a rubber material.

Once entry seal 410 is coupled to chamber 2 through electrofusion seal 114, electrical lines 90 may be received through entry seal 310 for routing through chamber 2. In particular, the outer diameter of electrical lines 90 or the outer diameter of a conduit carrying electrical lines 90 is less than the inner diameter of conduit 312, channels 426 of grommet 424, and opening 322 of compression nut 316. More particularly, grommet 424 is configured to seal against the outer diameter of one electrical line 90 extending through channel 426 or is configured to seal against an outer diameter of a conduit carrying one or more electrical lines 90. As such, electrical lines 90 pass extend through passageway 313, through grommet 424, and through compression nut 316. To seal interior volume 50 of chamber 2 from any vapor or fluids in passageway 313, compression nut 316 which pushes grommet 424 into inlet 8 and/or outlet 10 and conduit 312, respectively, to form a hermetic seal to reduce the flow of any vapor or fluids from passageway 313 into interior volume 50 (FIG. 2).

Figure 21:
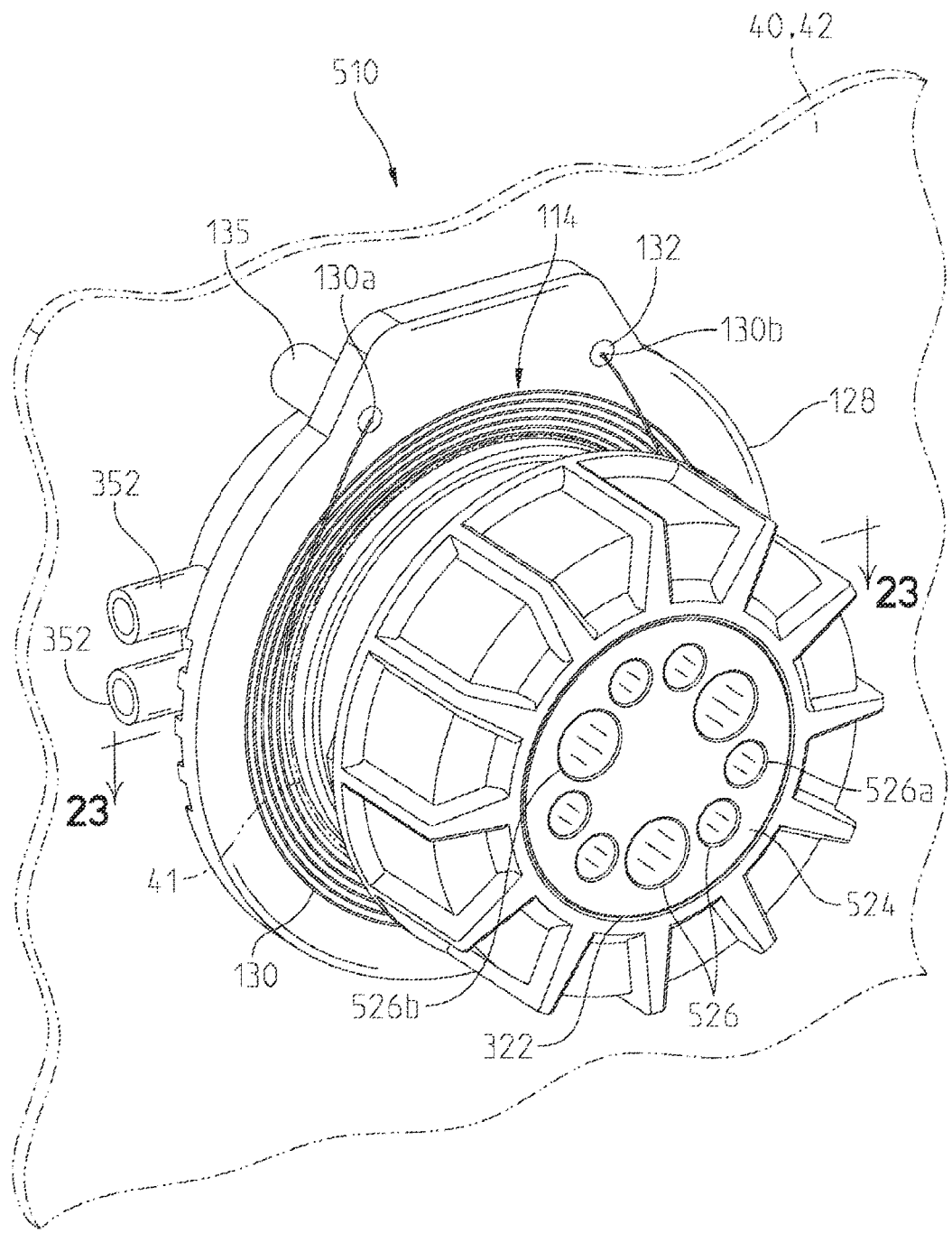
FIG. 21 is a perspective view of a fifth embodiment of an entry seal for the inlet and/or outlet of the chamber of FIG. 1.
Figure 22:
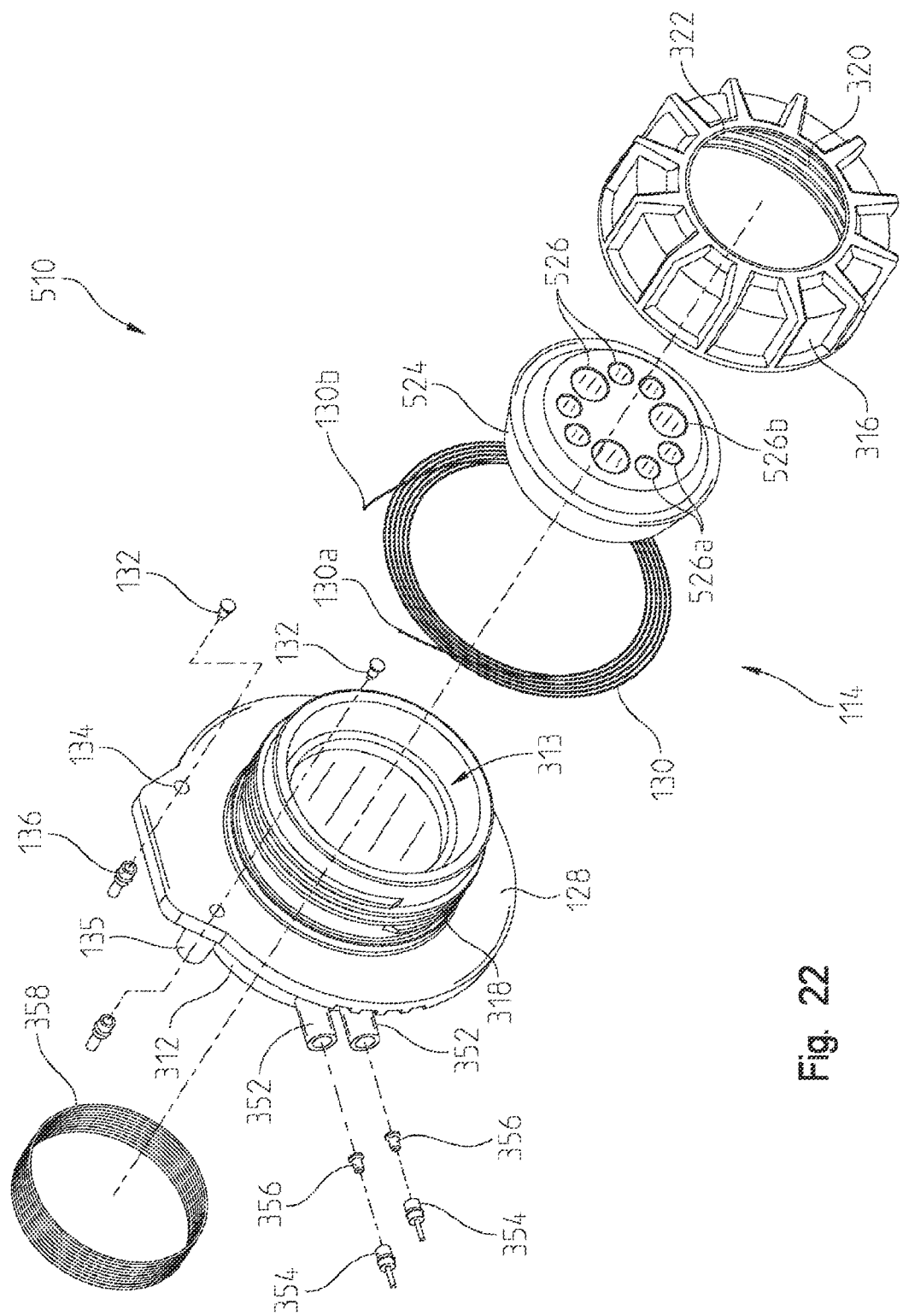
FIG. 22 is an exploded view of the fifth embodiment entry seal of FIG. 21.
Figure 23:
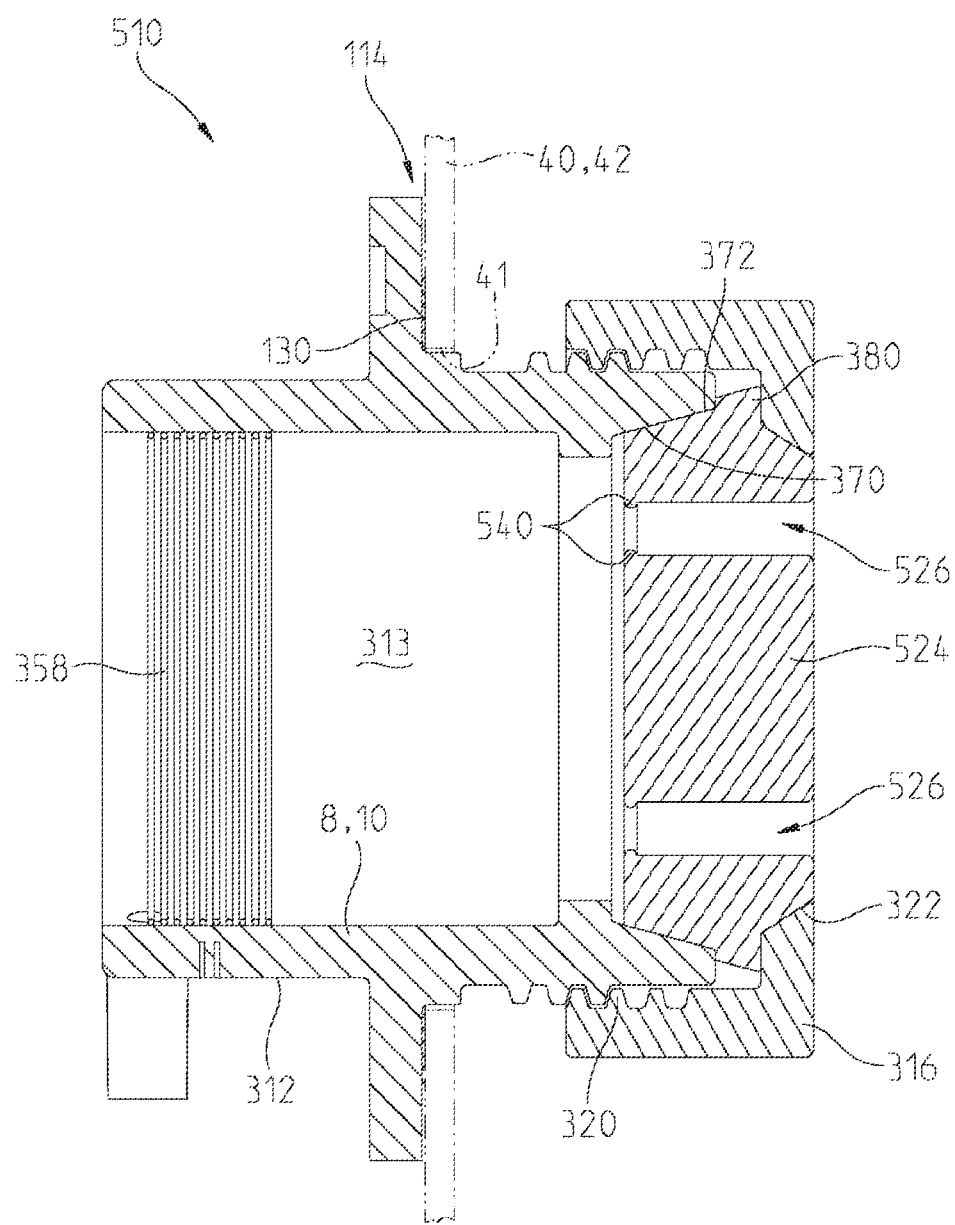
FIG. 23 is a cross-sectional view of the fifth embodiment entry seal of FIG. 21, taken along line 23-23 of FIG. 21.

Referring to FIGS. 21-23, a fifth embodiment of an entry seal 510 has corresponding features with similar construction and function to features of entry seal 310, with the corresponding features represented by identical reference numbers. Entry seal 510 is identical to entry seal 310 except that entry seal 510 includes a grommet 524, rather than grommet 324. Grommet 524 includes a plurality of open channels 526 to allow electrical lines 90 to extend through passageway 313 and opening 322 of compression nut 316. Channels 526 generally define a circle in cross-section and each channel 526 may have the same or a different diameter than adjacent channels 526. Illustratively, grommet 524 includes nine channels 526 arranged in a circular configuration, however, grommet 524 may include any number and/or configuration of channels 526. As shown in FIGS. 21 and 22, grommet 524 includes first channels 526a with a diameter less than second channels 526b. Illustratively, each first channels 526a is adjacent another first channel 526a and second channel 526b. In one embodiment, grommet 524 includes six first channels 526a and three second channels 526b. Grommet 524 also may have a slot (not shown) in channels 126 for accessing electrical lines 90 and may include a circumferential rib 540 molded into at least one end of grommet 524 for further retaining electrical lines 90 and/or a conduit (not shown) within channel 526. In one embodiment, grommet 524 may be comprised of a rubber material.

Once entry seal 510 is coupled to chamber 2 through electrofusion seal 114, electrical lines 90 may be received through entry seal 510 for routing through chamber 2. In particular, the outer diameter of electrical lines 90 or the outer diameter of a conduit carrying electrical lines 90 is less than the inner diameter of conduit 312, channels 526 of grommet 524, and opening 322 of compression nut 316. More particularly, grommet 524 is configured to seal against the outer diameter of one electrical line 90 extending through channel 526 or is configured to seal against an outer diameter of a conduit carrying one or more electrical lines 90. As such, electrical lines 90 pass extend through passageway 313, through grommet 524, and through compression nut 316. To seal interior volume 50 of chamber 2 from any vapor or fluids in passageway 313, compression nut 316 which pushes grommet 524 into inlet 8 and/or outlet 10 and conduit 312, respectively, to form a hermetic seal to reduce the flow of any vapor or fluids from passageway 313 into interior volume 50 (FIG. 2).

Figure 24:
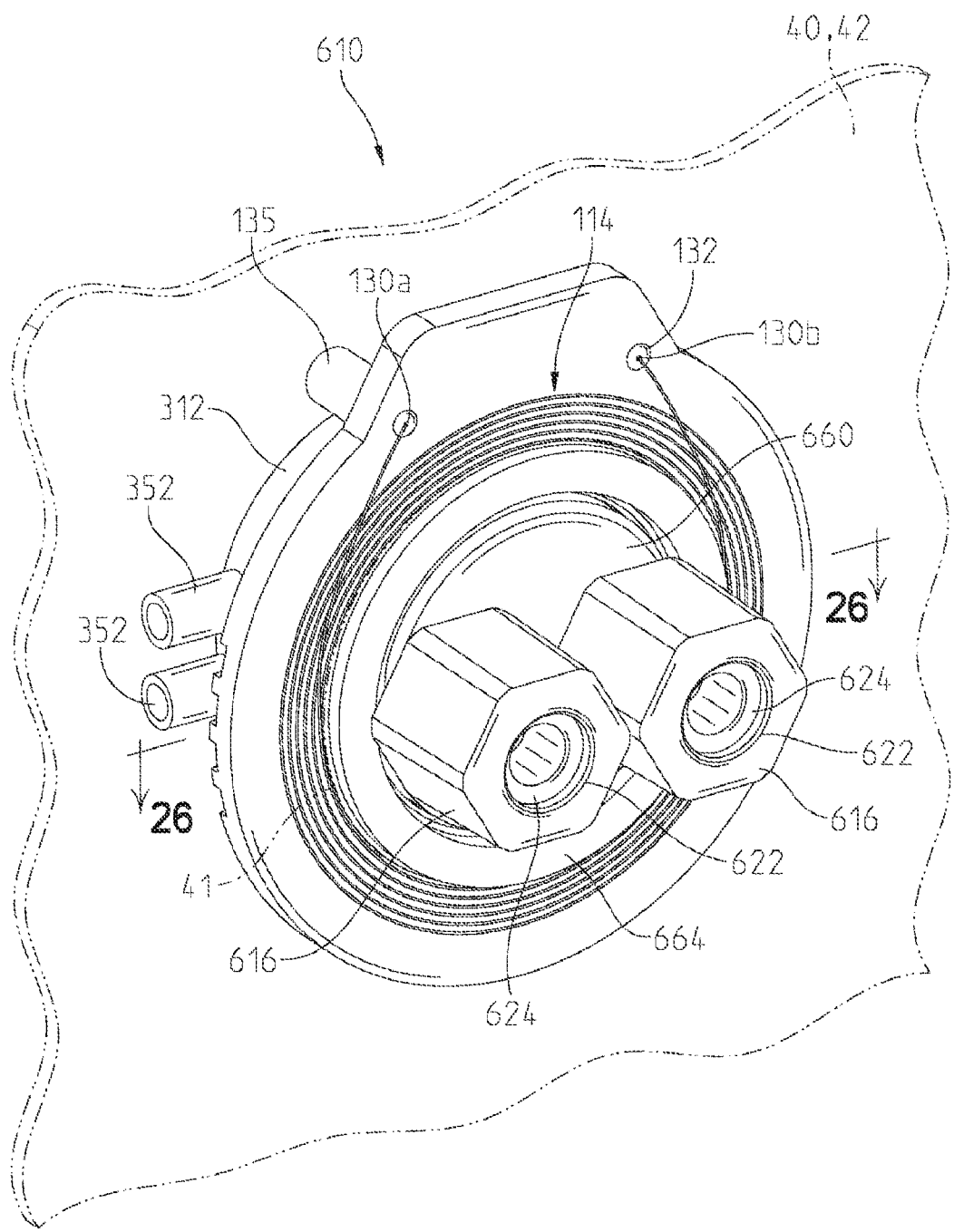
FIG. 24 is a perspective view of a sixth embodiment of an entry seal for the inlet and/or outlet of the chamber of FIG. 1.
Figure 25:
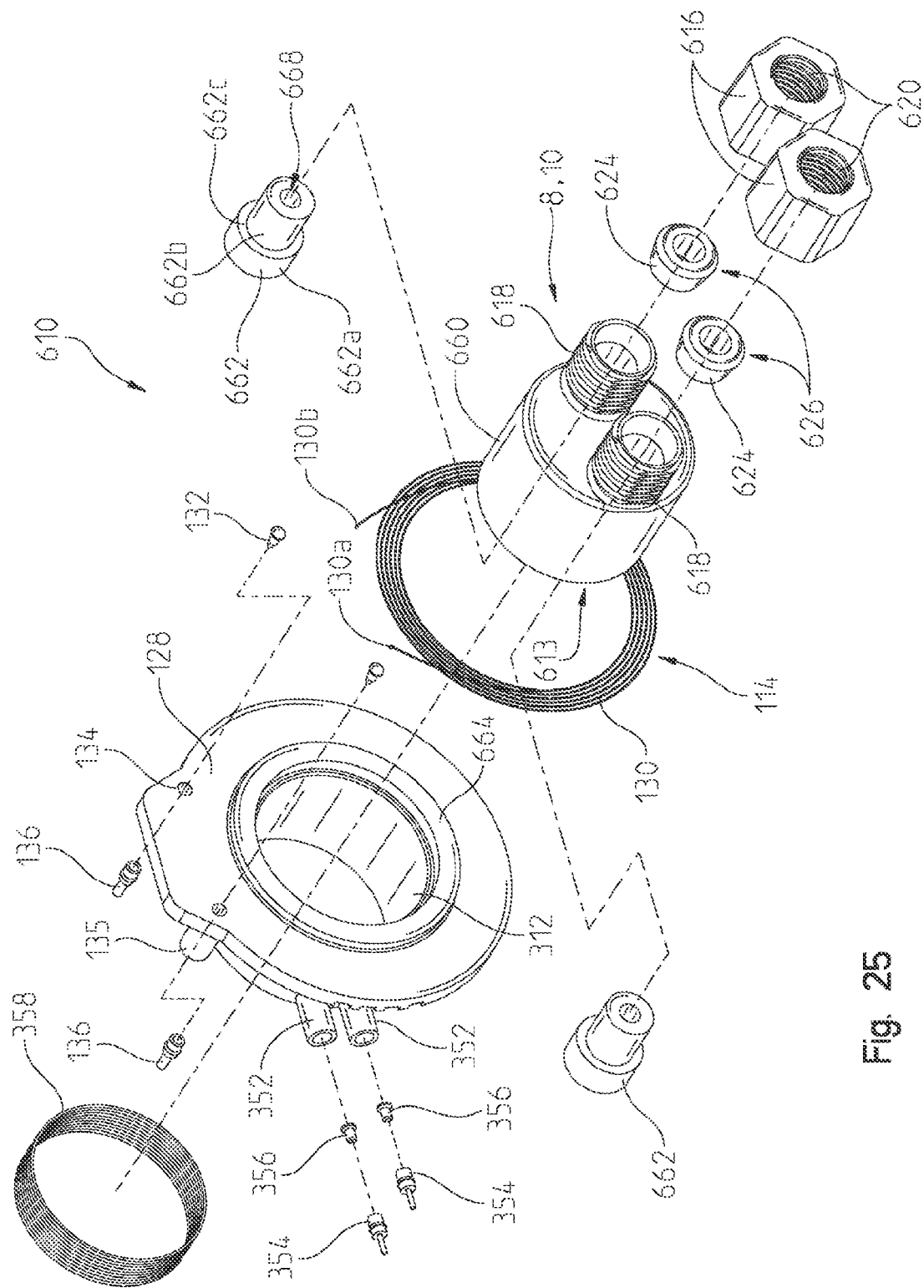
FIG. 25 is an exploded view of the sixth embodiment entry seal of FIG. 24.
Figure 26:
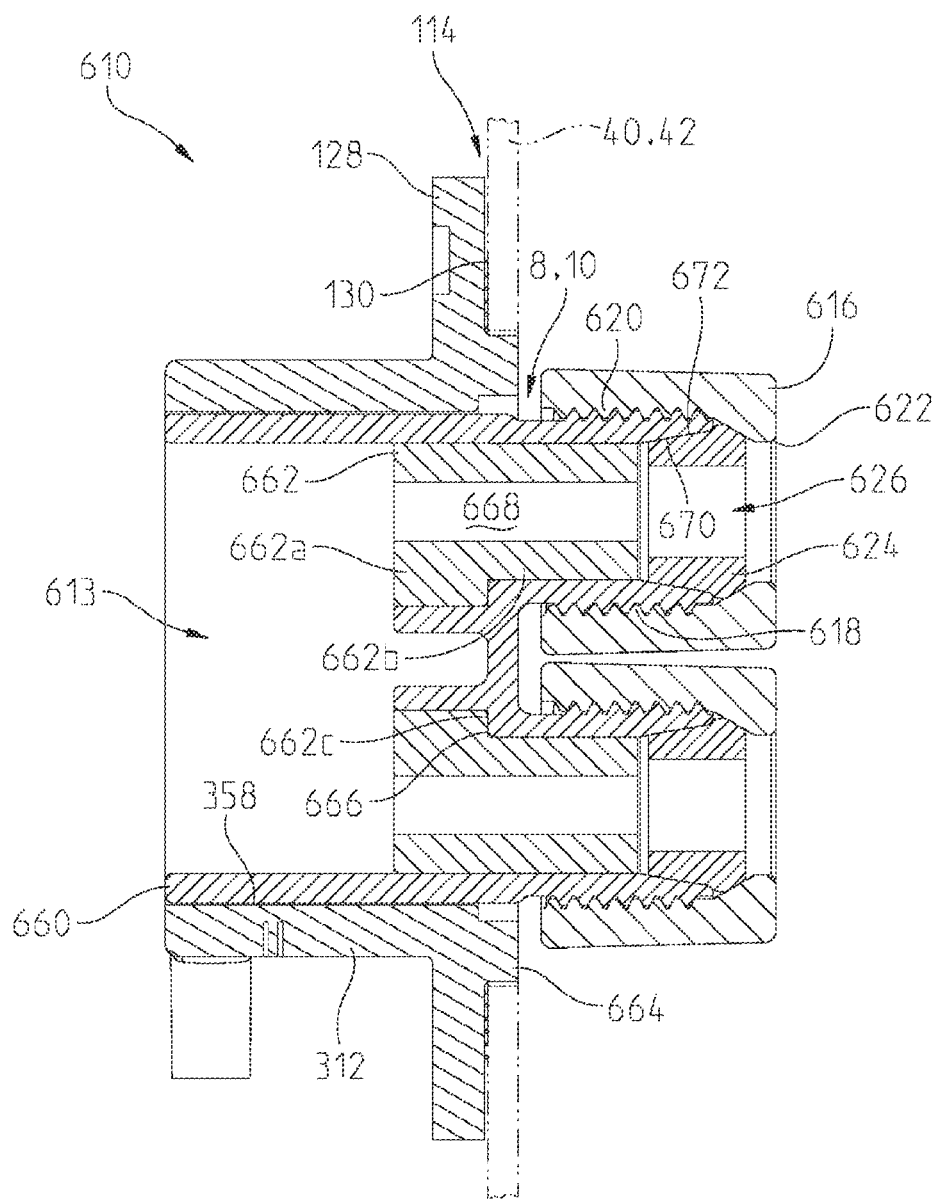
FIG. 26 is a cross-sectional view of the sixth embodiment entry seal of FIG. 24, taken along line 26-26 of FIG. 24.

Referring to FIGS. 24-26, a sixth embodiment of an entry seal 610 is shown. Corresponding features of entry seal 610 are similar in construction and function to features of entry seal 310, with the corresponding features represented by identical reference numbers. Entry seal 610 includes support member 128 which, illustratively, include a flange 664. As shown in FIG. 26, opening 41 of wall 40, 42 is sized to receive flange 664. Flange 664 may be provided on any of entry seals 110, 210, 310, 410, 510, 610, 710.

Additionally, entry seal 610 includes both electrofusion seal 114 positioned on wall 40, 42 and a plurality of compression nuts 616 also positioned on wall 40, 42. Electrofusion seal 114 and compression nuts 616 may be positioned on opposing sides of wall 40, 42 or on the same side of wall 40, 42. Illustratively, entry seal 610 includes two compression nuts 616. Compression nuts 616 may be comprised of a polymeric material, such as a nylon material, and are removably coupled to inlets 8 and/or outlets 10. More particularly, each compression nut 616 includes internal threads 620 which are threadedly coupled to external threads 618 on inlet 8 and/or outlet 10. Because compression nuts 616 are removable from inlet 8 and/or outlet 10 by unscrewing internal threads 620 from external threads 618, access to electrical lines 90 extending through passageway 613 is achieved for installing, removing, repairing, or replacing electrical lines 90.

As shown in FIGS. 24-26, a grommet 624 of the compression seal of entry seal 510 may be positioned within a portion of each compression nut 616 and a portion of inlet 8 and/or outlet 10 for sealing a passageway 613. For example, grommet 624 may be a vapor and fluid seal configured to seal interior volume 50 (FIG. 2) of chamber 2 from vapors and fluids. Each grommet 624 includes an open channel 626 to allow electrical lines 90 to extend through both passageway 613, through grommet 624, and through an opening 622 of compression nut 616 in order to extend through chamber 2. Channel 626 generally defines a circle in cross-section but may have any other size or shape. In one embodiment, grommet 624 also may have a slot (not shown) in channels 126 for accessing electrical lines 90. Illustratively, grommet 624 has a tapered surface 670 configured to abut a complementary tapered surface 672 of inlet 8 and/or outlet 10. In one embodiment, grommet 624 is comprised of a polymeric material, for example a rubber material.

As shown in FIGS. 25 and 26, inlets 8 and/or outlets 10 extend from a housing 660 positioned within passageway 313 of support member 128. Housing 660 has a cylindrical configuration and an outer diameter of housing 660 is received within the inner diameter of conduit 312 such that passageway 613 extends through housing 660. Housing 660 is coupled to conduit 312 with electrofusion socket winding 358. More particularly, as shown in FIG. 26, electrofusion socket winding 358 is positioned intermediate a portion of the outer diameter of housing 660 and a portion of the inner diameter of conduit 312. As such, when a welder (not shown) is operably coupled to electrofusion socket winding 358 through pins 354 and plugs 356, electrofusion socket winding 358 transmits heat to a portion of conduit 312 and housing 660. The heat transmitted from electrofusion socket winding 358 melts the portions of conduit 312 and housing 660 at electrofusion socket winding 358. The melted portions of conduit 312 and housing 660 then fuse together to permanently couple conduit 312 to housing 660 for carrying electrical lines 90 through conduit 312, through housing 660, and through compression nuts 616.

As shown in FIGS. 25 and 26, housing 660 also includes an interior shoulder 666 abutting inlets 8 and/or outlets 10. Shoulder 666 of housing 660 is configured to receive a plurality of potting members 662. Potting members 662 include a head portion 662a and a leg portion 662b. A transverse surface 662c of head portion 662a is configured to abut shoulder 666 of housing 660. As such, when entry seal 610 is assembled, head portion 662a is positioned within housing 660 and leg portion 662b extends into inlets 8 and/or outlets 10. An internal channel 668 of potting members 662 is configured to align with channel 626 of grommet 624 to allow electrical lines 90 to extend through conduit 312, through housing 666, and through compression nuts 616 in order to extend through chamber 2. In one embodiment, potting members 662 are comprised of a polymeric material configured to sealingly maintain electrical lines 90 within conduit 312 and channels 626, 668.

Once entry seal 610 is coupled to chamber 2 through electrofusion seal 114, electrical lines 90 may be received through entry seal 610 for routing through chamber 2. In particular, the outer diameter of electrical lines 90 or the outer diameter of a conduit carrying electrical lines 90 is less than the inner diameter of conduit 312, channels 626 of grommet 624, and opening 622 of compression nut 616. More particularly, grommet 624 is configured to seal against the outer diameter of one electrical line 90 extending through channel 626 or is configured to seal against an outer diameter of a conduit carrying one or more electrical lines 90. As such, electrical lines 90 pass extend through passageway 613, through grommet 624, and through compression nut 616. To seal interior volume 50 of chamber 2 from any vapor or fluids in passageway 613, compression nut 616 which pushes grommet 624 into inlet 8 and/or outlet 10 and conduit 312, respectively, to form a hermetic seal to reduce the flow of any vapor or fluids from passageway 613 into interior volume 50 (FIG. 2).

Figure 27:
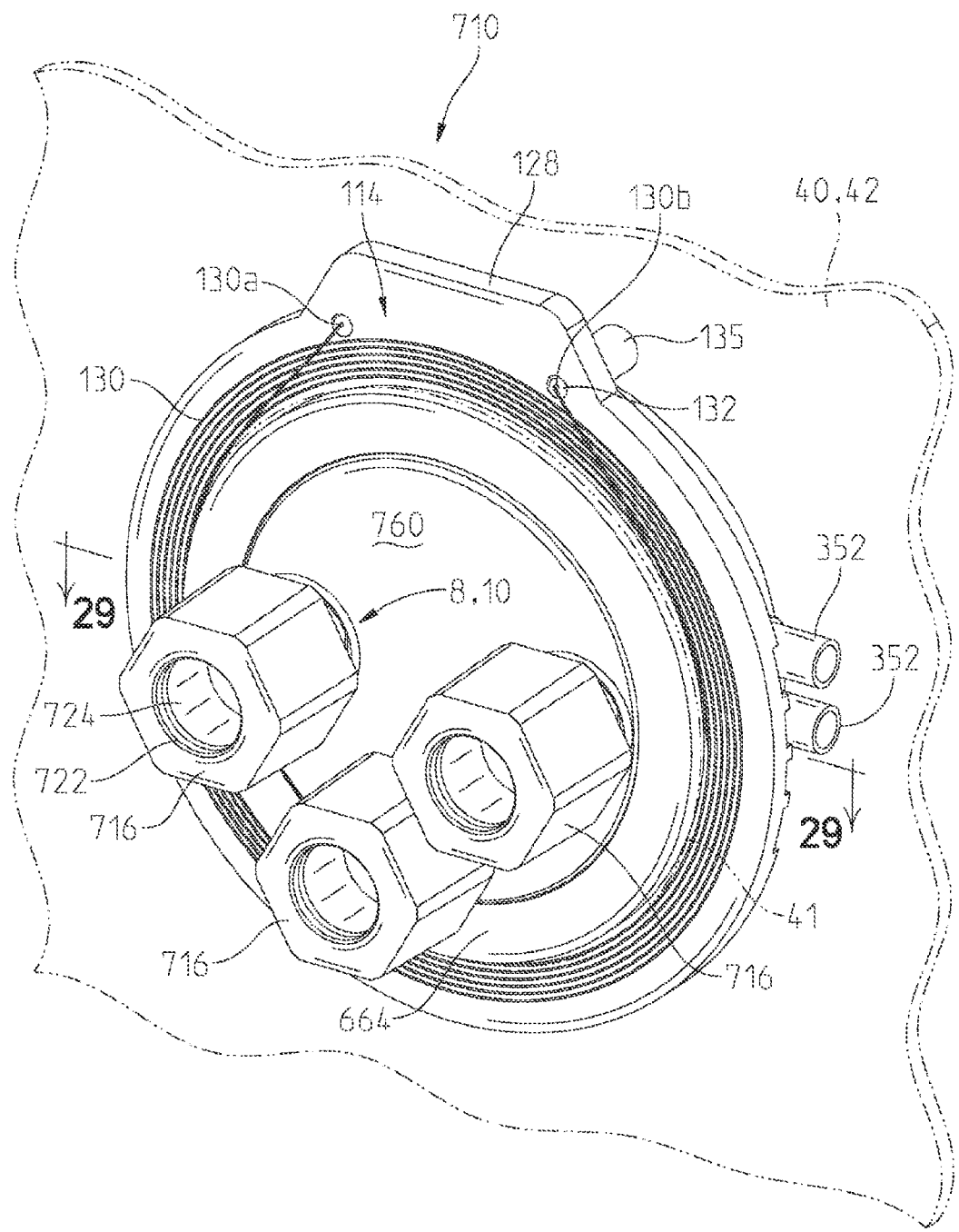
FIG. 27 is a perspective view of a seventh embodiment of an entry seal for the inlet and/or outlet of the chamber of FIG. 1.
Figure 28:
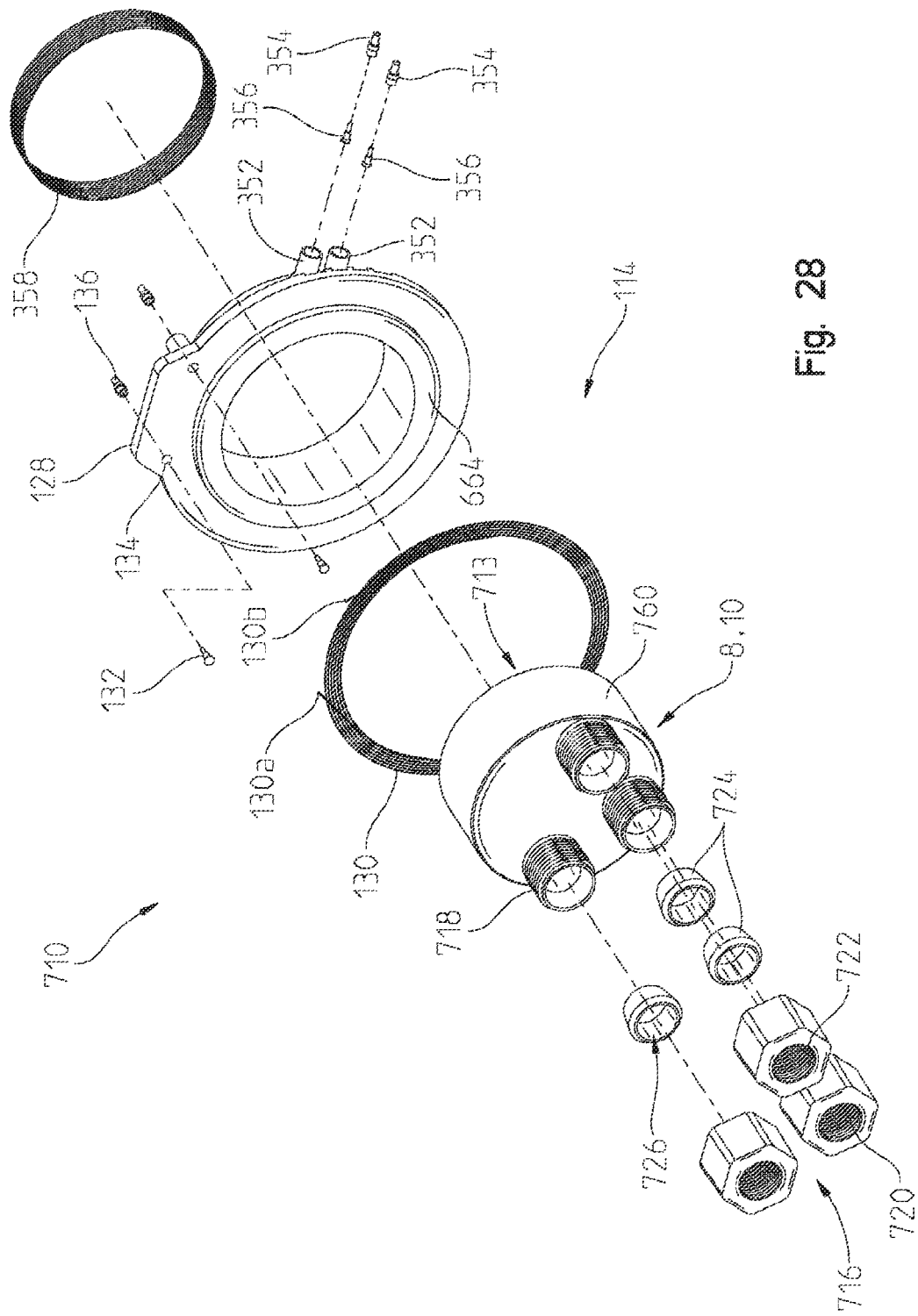
FIG. 28 is an exploded view of the seventh embodiment entry seal of FIG. 27.
Figure 29:
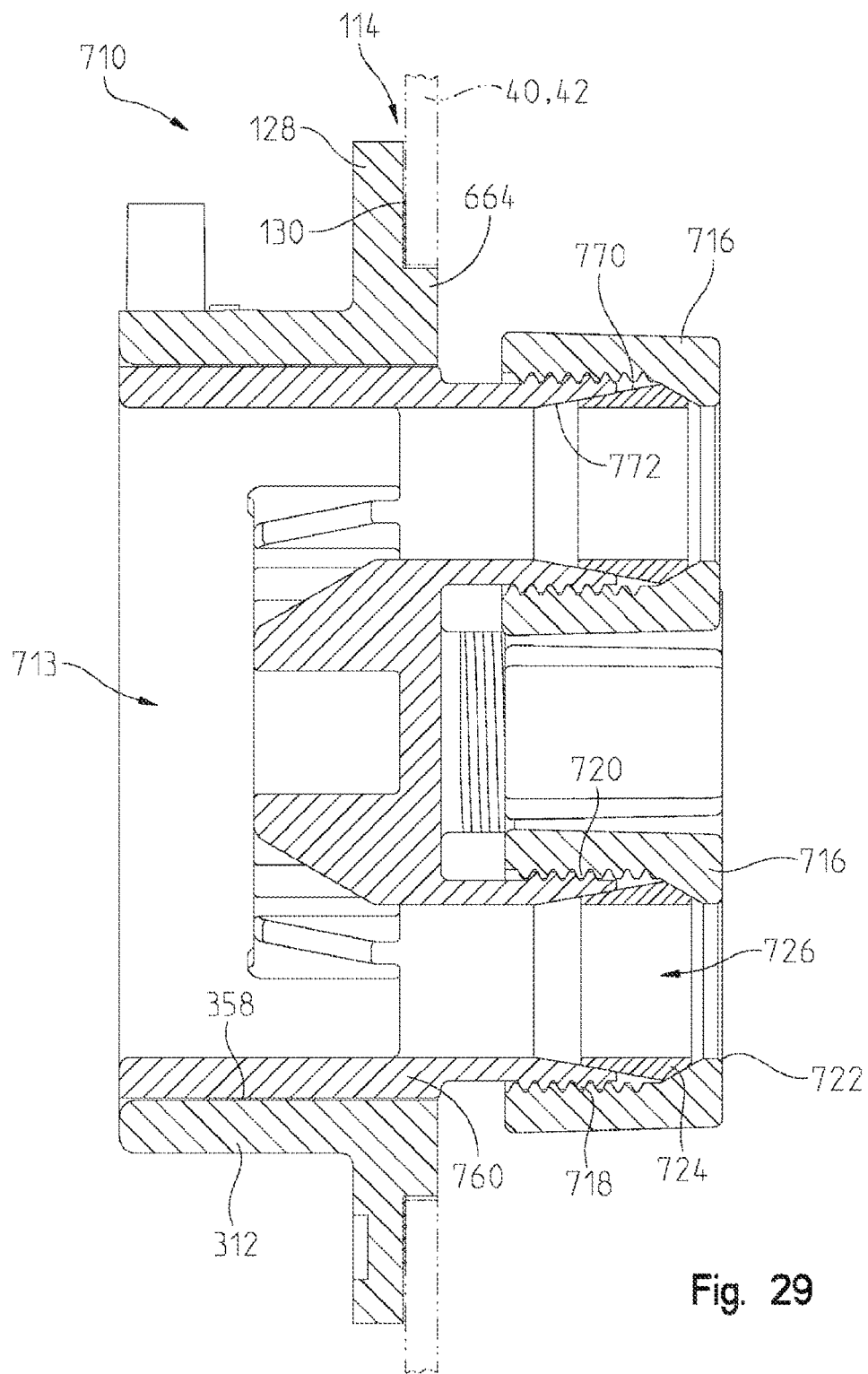
FIG. 29 is a cross-sectional view of the seventh embodiment entry seal of FIG. 27, taken along line 29-29 of FIG. 27.

Referring to FIGS. 27-29, a seventh embodiment of an entry seal 710 is shown. Corresponding features of entry seal 710 are similar in construction and function to features of entry seal 610, with the corresponding features represented by identical reference numbers. Entry seal 710 includes both electrofusion seal 114 positioned on wall 40, 42 and a plurality of compression nuts 716 positioned on wall 40, 42. Electrofusion seal 114 and compression nuts 716 may be positioned on opposing sides of wall 40, 42 or on the same side of wall 40, 42. Illustratively, entry seal 710 includes three compression nuts 716. Compression nuts 716 may be comprised of a polymeric material, such as a nylon material, and are removably coupled to inlets 8 and/or outlets 10. More particularly, each compression nut 716 includes internal threads 720 which are threadedly coupled to external threads 718 on inlet 8 and/or outlet 10. Because compression nuts 716 are removable from inlet 8 and/or outlet 10 by unscrewing internal threads 720 from external threads 718, access to electrical lines 90 extending through a passageway 713 is achieved for installing, removing, repairing, or replacing electrical lines 90.

As shown in FIGS. 27-29, a grommet 724 of the compression seal of entry seal 710 may be positioned within a portion of each compression nut 716 and a portion of inlet 8 and/or outlet 10 for sealing passageway 713. For example, grommet 724 may be comprised of a rubber material to define a fluid and vapor seal configured to seal interior volume 50 (FIG. 2) of chamber 2 from fluids and vapors. Grommet 724 includes an open channel 726 to allow electrical lines 90 to extend through both passageway 713 and an opening 722 of compression nut 716 in order to extend through chamber 2. In one embodiment, grommet 724 also may have a slot (not shown) in channels 126 for accessing electrical lines 90.

Grommet 724 has a tapered surface 770 and inlet 8 and/or outlet 10 also include a complementary tapered surface 772 configured to receive tapered surface 770 of grommet 724, as shown in FIG. 29. As such, tapered surface 770 of grommet 724 is received within inlet 8 and/or outlet 10 and grommet 724 extends from inlet 8 and/or outlet 10 into compression nut 716 to sealingly maintain the position of electrical lines 90 at inlet 8 and/or outlet 10.

Once entry seal 710 is coupled to chamber 2 through electrofusion seal 114, electrical lines 90 may be received through entry seal 710 for routing through chamber 2. In particular, the outer diameter of electrical lines 90 or the outer diameter of a conduit carrying electrical lines 90 is less than the inner diameter of conduit 312, channels 726 of grommet 724, and opening 722 of compression nut 716. More particularly, grommet 724 is configured to seal against the outer diameter of one electrical line 90 extending through channel 726 or is configured to seal against an outer diameter of a conduit carrying one or more electrical lines 90. As such, electrical lines 90 pass extend through passageway 713, through grommet 724, and through compression nut 716. To seal interior volume 50 of chamber 2 from any vapor or fluids in passageway 713, compression nut 716 which pushes grommet 724 into inlet 8 and/or outlet 10 and conduit 312, respectively, to form a hermetic seal to reduce the flow of any vapor or fluids from passageway 713 into interior volume 50 (FIG. 2).

Various features of each embodiment of entry seals 110, 210, 310, 410, 510, 610, 710 may be used with any other feature of any other entry seal disclosed herein. Therefore, any of the features disclosed herein with respect to entry seals 110, 210, 310, 410, 510, 610, 710 may be combined to form alternative embodiment entry seals in accordance with the present disclosure.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A chamber for a fueling system, comprising:
   a housing having a lower surface and including at least one raised portion and at least one recessed portion;
   a plurality of inlets to the housing; and
   a plurality of outlets from the housing, wherein electrical lines extending between the inlets and the outlets are positionable within the at least one recessed portion below the at least one raised portion, the at least one raised portion extending to a height within the housing and presenting an upper surface within the housing on which a service technician positioned in the housing may step without stepping on electrical lines positioned below the raised portion, whereby the service technician can step on the raised portion without disturbing the electrical lines positioned in the recessed portion.

2. The chamber of claim 1, wherein the housing defines a unitary structure and is configured to receive a first plurality of electrical lines having a first voltage and a second plurality of electrical lines having a second voltage.

3. The chamber of claim 2, further comprising a panel received within the housing and positioned between the first plurality of electrical lines and the second plurality of electrical lines, wherein the housing includes a support member supporting the panel.

4. The chamber of claim 3, wherein at least one of the raised portions of the lower surface includes a second support member.

5. The chamber of claim 1, wherein the plurality of inlets are sealed to the electrical lines with a compression fitting.

6. The chamber of claim 1, wherein the plurality of outlets are sealed to the electrical lines with a compression fitting.

7. The chamber of claim 1, further comprising an entry seal positioned on the housing at one of the inlets and configured to be electrofused to the housing, the entry seal including a compression fitting.

8. The chamber of claim 1, further comprising an entry seal positioned on the housing at one of the outlets and configured to be electrofused to the housing, the entry seal including a compression fitting.

9. A chamber for a fueling system, comprising:
a housing having a first wall, a second wall opposite the first wall, a third wall coupled to the first and second wall, a fourth wall opposite the third wall, and a lower surface coupled to the first, second, third, and fourth walls;
a first support member positioned on the first wall adjacent an upper end of the first wall;
a second support member positioned on the first wall adjacent a lower end of the first wall, spaced apart from the first support member and spaced apart from the lower surface;
a third support member positioned on the second wall;
a fourth support member positioned on the second wall, spaced apart from the third support member and spaced apart from the lower surface;
a plurality of inlets to the housing;
a plurality of outlets from the housing; and
a panel configured to be positioned within the housing and supported by the first, second, third, and fourth support members.

10. The chamber of claim 9, wherein the panel includes a fifth support member configured to engage the lower surface of the housing.

11. The chamber of claim 9, wherein the panel includes an opening along an upper portion of the panel.

12. The chamber of claim 9, wherein the panel includes a first recessed portion and a second recessed portion along a lower portion of the panel.

13. The chamber of claim 12, wherein the panel includes a fifth support member configured to engage the lower surface of the housing and the fifth support member is positioned intermediate the first and second recessed portions.

14. The chamber of claim 13, wherein the lower surface of the housing includes at least one raised portion and at least one recessed portion, and at least one of the first and second recessed portion of the panel is configured to receive the at least one raised portion of the lower surface.

15. A chamber for a fueling system, comprising:
a housing having a first wall, a second wall opposite the first wall, a third wall coupled to the first and second wall, a fourth wall opposite the third wall, and a lower surface coupled to the first, second, third, and fourth walls;
a first support member positioned on the first wall;
a second support member positioned on the first wall and spaced apart from the first support member;
a third support member positioned on the second wall;
a fourth support member positioned on the second wall and spaced apart from the third support member;
a plurality of inlets to the housing;
a plurality of outlets from the housing; and
a panel configured to be positioned within the housing and supported by the first, second, third, and fourth support members;
wherein a plurality of electrical lines extends between the inlets and the outlets and includes a first plurality of low-voltage electrical lines and a second plurality of high-voltage electrical lines, and the panel is positioned intermediate the first plurality and the second plurality of electrical lines.

16. The chamber of claim 15, wherein the first support member is positioned adjacent an upper end of the first wall and the second support member is positioned adjacent a lower end of the first wall.

17. The chamber of claim 16, wherein the third support member is positioned adjacent an upper end of the second wall and the fourth support member is positioned adjacent a lower end of the second wall.

18. The chamber of claim 17, wherein the first and fourth support members are positioned substantially within a plane extending perpendicularly between the first and second walls.

19. The chamber of claim 17, wherein the second and third support members are positioned substantially within a plane extending perpendicularly between the first and second walls.

20. A fitting for sealing an opening through a wall forming a part of a fueling system, the fitting comprising:
a first surface;
a heating element positioned to heat the first surface of the fitting and the wall forming a part of the fueling system when the fitting is operably positioned adjacent the opening in the wall, whereby heating the first surface of the fitting and the wall with the heating element causes the fitting and the wall to bond and form a seal therebetween; and
a compression fitting forming a removable compression seal.

21. The fitting of claim 20, wherein the compression fitting comprises a threaded fitting extension defining a conduit and a grommet sized to fit within the conduit of the extension and having at least one opening sized to accommodate one of an electrical cable and a conduit extending through the grommet.

22. The fitting of claim 21, wherein the compression fitting comprises a compression nut threadably engagable with the threaded fitting extension, the compression nut operable to compress the grommet between the threaded fitting extension and the one of an electrical cable and a conduit extending through the grommet.

23. The fitting of claim 21, further comprising a support member and the heating element is supported on the support member.

24. The fitting of claim 21, wherein the at least one opening includes at least five openings.

25. The fitting of claim 20, further comprising a conduit and a second heating element is positioned within the conduit.

26. A chamber for a fueling system, comprising:
a housing having at least one wall;
a plurality of inlets to the housing and including the fitting of claim 20, each inlet being configured to receive at least one electrical line; and
a plurality of outlets from the housing.

27. The chamber of claim 26, wherein the compression fitting is removably coupled to one of the plurality of inlets.

28. The chamber of claim 26, wherein the grommet is positioned within a portion of the compression fitting and a portion of one of the inlets.

29. The chamber of claim 26, wherein the fitting further comprises a housing received within a conduit of the fitting, and at least one of the inlets extends from the housing.

30. The chamber of claim 29, wherein at least two of the inlets extend from the housing.

\* \* \* \* \*